US012190332B2

(12) United States Patent
Stonehouse

(10) Patent No.: US 12,190,332 B2
(45) Date of Patent: Jan. 7, 2025

(54) METHODS AND SYSTEMS FOR PSEUDORANDOM BATCH CODE PRINTING AND PRODUCT AUTHENTICATION

(71) Applicant: The Procter & Gamble Company, Cincinnati, OH (US)

(72) Inventor: Jonathan Richard Stonehouse, Windlesham (GB)

(73) Assignee: The Procter & Gamble Company, Cincinnati, OH (US)

( * ) Notice: Subject to any disclaimer, the term of this patent is extended or adjusted under 35 U.S.C. 154(b) by 245 days.

(21) Appl. No.: 17/852,426

(22) Filed: Jun. 29, 2022

(65) Prior Publication Data

US 2024/0005339 A1    Jan. 4, 2024

(51) Int. Cl.
G06Q 30/00    (2023.01)
G06Q 30/018    (2023.01)

(52) U.S. Cl.
CPC .............................. *G06Q 30/0185* (2013.01)

(58) Field of Classification Search
None
See application file for complete search history.

(56) References Cited

U.S. PATENT DOCUMENTS

| 7,684,088 | B2 | 3/2010 | Jordan et al. |
| 9,852,317 | B2 | 12/2017 | Kuniavsky et al. |
| 11,074,592 | B2 | 7/2021 | Stonehouse et al. |

(Continued)

FOREIGN PATENT DOCUMENTS

| CN | 106469336 A | 3/2017 |
| CN | 107563774 A | 1/2018 |
| WO | 2012109294 A1 | 8/2012 |

OTHER PUBLICATIONS

Beijing Run Technology Submits Chinese Patent Application for Authentication Method for Wearable Device. Publication info: Global IP News. Information Technology Patent News [New Delhi] Feb. 23, 2017. (Year: 2017).*

(Continued)

*Primary Examiner* — Matthew T Sittner
(74) *Attorney, Agent, or Firm* — Anna E. Haller; Angela K. Haughey

(57) ABSTRACT

Pseudorandom batch code printing and product authentication systems and methods are described comprising a batch code printing application (app) for generating an authenticating sequence of authentic pseudorandom numbers by inputting an initial seed value into a cryptographic algorithm to output an initial authenticating pseudorandom number in the authenticating sequence. A second alphanumeric code is generated based on a second authenticating pseudorandom number of the authenticating sequence. A printer is controlled to print a first pseudorandom batch code comprising the first alphanumeric code on a first product and a second pseudorandom batch code comprising the second alphanumeric code on a second product, where the first and second products are part of a product batch. An authentication app determines an identified product date and a suspect alphanumeric code from a suspect batch code as printed on a suspect product, and generates one of: (1) an authenticating output, or (2) a counterfeit output.

17 Claims, 9 Drawing Sheets

(56) References Cited

U.S. PATENT DOCUMENTS

| | | | |
|---|---|---|---|
| 2002/0049904 A1* | 4/2002 | Nowottnick | G07C 9/00857 |
| | | | 380/46 |
| 2008/0263117 A1 | 10/2008 | Rose et al. | |
| 2011/0280480 A1 | 11/2011 | Simske et al. | |
| 2012/0298741 A1 | 11/2012 | Grant et al. | |
| 2016/0070946 A1 | 3/2016 | Stonehouse et al. | |
| 2017/0032237 A1 | 2/2017 | Kuniavsky et al. | |
| 2018/0012234 A1* | 1/2018 | Kelly | G06Q 30/0185 |
| 2018/0012433 A1* | 1/2018 | Ricci | G01C 21/3617 |
| 2018/0211264 A1 | 7/2018 | Micali | |
| 2018/0268421 A1 | 9/2018 | Stonehouse | |
| 2019/0213604 A1 | 7/2019 | Meadows et al. | |
| 2019/0392458 A1 | 12/2019 | Stonehouse | |
| 2020/0359212 A1* | 11/2020 | Chen | H04L 63/102 |
| 2021/0192340 A1 | 6/2021 | Stonehouse et al. | |

OTHER PUBLICATIONS

Time-Efficient Cloning Attacks Identification in Large-Scale RFID Systems. Author: Ju-min, Zhao;Ding, Feng;Deng-ao, Li;Gong, Wei;Hao-xiang, Liu;Shi-min Huo. Publication info: Security and Communication Networks 2017 Hindawi Limited. (2017). (Year: 2017).*

SVD and pseudorandom circular chain based watermarking for image authentication. Author: Song, Wei; Hou, Jianjun; Li, Zhaohong. Publication info: Beijing Jiaotong Daxue Xuebao (Journal of Beijing Jiaotong University) 32.2: 71-75. (Year: 2008).*

\* cited by examiner

FIG. 5A

METHODS AND SYSTEMS FOR PSEUDORANDOM BATCH CODE PRINTING AND PRODUCT AUTHENTICATION

FIELD

The present disclosure generally relates to systems and methods for anti-counterfeiting of physical products, and more particularly to, systems and methods for pseudorandom batch code printing and product authentication used for anti-counterfeiting.

BACKGROUND

Counterfeit items are a large problem in many industries, particularly in developing countries. They can erode consumer confidence or in extreme cases, cause actual, physical harm, and/or generate losses for manufacturers and distributors. For example, a customer who receives a poor quality counterfeit may associate that bad experience with the brand. Even in developed markets, where counterfeiting is a more rare occurrence, significant brand risk exists. For example, a study from the 1990s on a poor-quality counterfeit shampoo released in Europe showed that on average a disappointed consumer told six people about a poorly performing product.

A variety of methods have been used over the years to allow the verification of the authenticity of items, including holographic labels, RFID tags, and overt and covert codes. Although these methods may provide a way to detect counterfeit items, they also involve additional costs and/or complexity to the production or otherwise manufacturing process. Costs constraints are particularly acute for fast-moving consumer goods that have low margins. For example, adding a complex yet effective identifying mark (e.g., a data matrix code, a QR code, etc.) may require prohibitive capital expenses to replace and/or retrofit existing equipment (e.g., label printers/embossers). Other product tracking techniques such as those that rely on blockchain require consistent physical control of supply chains, which is not possible in many practical scenarios wherein a manufacturer or distributor lacks such control. Still further, existing counterfeit detection techniques do not utilize existing distributed mobile computing resources, e.g., via crowd-sourcing.

A variety of techniques have recently been proposed that involve manipulation of existing codes and/or information provided on a product for tracking purposes. For example, WO 2012/109294 A1 discloses a method of printing a product code with one or more modified characters. The method uses an existing alphanumeric value that is determined by, for example, the date and location of manufacture, and existing printing technology. An algorithm is applied to digits in the original code (pre-modification), and based on the output of the algorithm, one or more digits in the code are selected and modified in a predetermined manner. For example, the modification may involve removal of a pixel of an individual digit that is barely perceptible to the naked eye, but that provides a clear signal to someone actively seeking to verify the authenticity of the product.

While such techniques are considerably useful in terms of helping manufacturers, retailers, and end users to ascertain the authenticity of products, counterfeiters are becoming more sophisticated at interpreting such codes and being able to replicate them. This problem becomes exacerbated for manufacturers or otherwise entities using imaging analysis to detect counterfeit items or products. This is because the ever increasing numbers of counterfeit items, each of which may have various shapes, sizes, and graphics—and, each of which may employ various techniques to mimic authentic products—can be vastly different in their configuration and/or appearance, even if such differences may be subtle in visual appearance. Such vast numbers of different counterfeit products and images create difficulties in building robust image based systems to combat product counterfeiting, at least because it is difficult for a manufacturer or entity to readily identify, gather, or otherwise access the various numbers and different types of counterfeit images of counterfeit products as created by different counterfeiters for building and developing robust and/or accurate systems.

For example, US 2019/0392458 A1, entitled "Method of Determining Authenticity of a Consumer Good," describes a method of classifying a consumer good as authentic, where the method leverages machine learning and the use of steganographic features on a given authentic consumer good. While the method may be used to identify steganographic features on authentic consumer good(s) for the purpose of authentication consumer goods, the method, and its underlying machine learning model, is limited because it relies on vast numbers of real-world images of non-authentic consumer goods, which can be prohibitively costly or time consuming to obtain, organize, structure, or otherwise aggregate. For the same reasons, data pre-processing and/or training of a robust machine-learning model with such real-world images of non-authentic consumer goods can cause errors and delays, or other issues in preparing or supervising the training dataset that would otherwise be required for generation of a robust machine learning model. This can come about because such vast numbers of real-world images of non-authentic consumer goods may have different, unknown, and/or underrepresented depictions of non-authentic features, which would cause significant manual processing and/or manipulation to prepare a training dataset for generation of a robust machine learning model.

Still further, an underlying issue of each of these, and other more conventional solutions for combatting counterfeits, involves printing unique per item codes on each and storing the large quantity of these codes, and/or other data to before authentication and/or counterfeit detection. In particular, the authentic codes are typically stored in a database and must be looked-up each time an authentication check (or match) is made to determine whether a particular product is authentic or counterfeit. For manufacturers that produce millions or billions of products, the storage and maintenance of such codes is technically inefficient typically requiring immense computer memory storage capacity, such large capacity databases, where access and utilization of these data resources is needed in order to scale with a large amounts of products.

For the foregoing reasons, there is a need for systems and methods for anti-counterfeiting of physical products, and more particularly to, systems and methods for pseudorandom batch code printing and product authentication used for anti-counterfeiting.

SUMMARY

Counterfeit products constitute a global problem. The manufacturing and producing industry has a need for more advanced resources and distributed involvement to identify counterfeits. The present techniques disclosed herein solve a long standing problem of performing counterfeit detection at scale, without incurring significant capital and time expenditures, by leveraging pseudorandom batch code printing and product authentication systems and methods as described herein.

With the present techniques, a manufacturer or distributor can use a cryptographic algorithm to create batch codes with related alphanumeric codes and dot codes for printing on physical products, which can include many thousands or tens of thousands products—all without requiring memory storage of the batch codes for authenticating such products. In particular, the inventive solution of the present application allows for generation a specific known set of valid or otherwise authentic alphanumeric codes for printing on respective products. After the codes are printed, all of the information needed to calculate the alphanumeric codes is visible on the product itself. This results in technical benefits to the underlying system as the underlying system is no longer required to store, in a database or otherwise in memory, millions or billions of product codes, as would a conventional authentication system. Instead, the inventive solution of the present application allows for authentication to occur by use of the information on a product itself as input into the cryptographic algorithm used to originally print the information on a product when the product was manufactured.

In various aspects, the cryptographic algorithm may be configured in a way to produce authenticating sequences of pseudorandom numbers for creation of alphanumeric codes and dot codes. The alphanumeric codes and/or dot codes may be printed on products, and the products may be distributed to physical locations. The alphanumeric codes and/or dot codes are configured for scanning and imaging. For example, in one aspect, a user computing device, such as a smart phone, may be used to image or scan products (e.g., via optical recognition) in a retail or other environment in order to identify a product's alphanumeric code and/or dot code along with a date of manufacture or other batch code information of the product. The date, or other batch code information, may be fed into the cryptographic algorithm to generate a test sequence of test pseudorandom numbers and related test pseudorandom alphanumeric numbers. The test pseudorandom alphanumeric numbers may be compared to the product's alphanumeric code and/or dot code to determine whether the alphanumeric code and/or dot code are part of, or are derivable from, or otherwise associated with, the test pseudorandom alphanumeric numbers. If so, then the product can be identified as an authentic product; if not, the product can be identified as a counterfeit. All of this activity can occur without storing in memory the original set of alphanumeric codes and/or dot codes that were originally printed on the products.

In a preferred example aspect, a grouping of four pseudo random alphanumeric characters or otherwise values (e.g., alpha or number values, such as A-Z, a-z, 0-9) are generated or otherwise determined for a given alphanumeric code. Each of the pseudo random alphanumeric characters or otherwise values are based on output of a cryptographic algorithm that uses information (e.g., date, manufacturing plant ID, etc.) in a batch code as an initial seed value. The cryptographic algorithm first calculates an authenticating sequence of authentic pseudorandom numbers using the initial seed value. These authentic pseudorandom numbers are then converted into a choice of the alphanumeric values (e.g., A-Z, a-z, 0-9), e.g., by using the value of a given pseudorandom number to reference or index a location in a font table, e.g. number 001 indicating a location or index of 1 in the font table, which may correspond to a specific value or character (e.g., "A").

In this way, by inputting the batch code information, including the date of manufacture of the product, into the cryptographic algorithm, each alphanumeric code that is output by the cryptographic algorithm may be unique or approximately unique for any given date. This is because there can be a different sequence of valid numbers for every calendar date. For example, for a pseudo random alphanumeric code with four values (e.g., alpha or number values), there can be approximately 1.4 million possible codes. A typical batch of a product, especially in fast-moving consumer goods, is on the order of several tens of thousands of products (e.g., 30,000 products). That is, in some aspects, the product is a fast-moving consumer goods product. Non-limiting examples of such products include non-durable consumer goods, such as packaged foods, beverages, toiletries, candies, cosmetics, over-the-counter drugs, dry goods, and other consumables, or the like. Other non-limiting examples of such products include: fabric care; home care; baby care; feminine care family care; grooming; oral care; personal health care; and combinations thereof. This makes the approximately 1.4 million possible codes more than sufficient for use in authentication and counterfeit detection purposes. For example, use of 30,000 alphanumeric codes from a size of 1.4 million possible codes yields only a fraction (2%) utilization of the possible code. Such small utilization reduces the chances (e.g., a 2% chance) that a counterfeiter would select one of the authentic alphanumeric codes from the unique set of 30,000 alphanumeric codes. It should be noted that while four characters or otherwise values are shown and described herein for generation of an alphanumeric code, different and/or additional characters or otherwise values may also be used. For example, two character or three character alphanumeric codes may be generated where a higher risk of counterfeiting is determined to be acceptable or when there is restricted space on the item. On the other hand, five character or more character alphanumeric codes may be generated where a lower risk of counterfeiting is needed or desired.

In addition, in various aspects, each alphanumeric value (e.g., A-Z, a-z, 0-9) of a given alphanumeric code may be printed to have a specific font. A font can be chosen from a font table, e.g., a data structure in computer memory. By applying a specific font to each of the alphanumeric values of a given alphanumeric code, the given alphanumeric code may be made further unique because the fonts of the font table can be differently sized, differently stylized, have missing or additional portions, or otherwise include modifications such as that an alphanumeric character or otherwise value ("A") at one location in the font table may have a different appearance or otherwise configuration compared to another alphanumeric character or otherwise value ("A") at a different location in the font table.

In still further aspects, a dot code, comprising a matrix of dots, may be generated based on a given alphanumeric code. A dot code comprises a scannable or otherwise machine-readable graphical or dot-based representation of an alphanumeric code. In some aspects, the dot code alone (without its corresponding alphanumeric code) may be printed on a given product. The alphanumeric code may be determined based on the arrangement or placement of the matrix of dots in the dot code. In various aspects, a manufacturer or otherwise plant producing the products, can determine what type of batch code and related information to print on surface or substrate of a product. This can include whether to include both the alphanumeric code and the dot code, or just the dot code. Use of the dot code alone be useful on small packages or products, or otherwise products that have limited surface area for printing batch code information.

The batch code including the alphanumeric code and/or dot code are each scannable or imaginable by a scanner or camera of user computing device, e.g., a mobile phone. Thus a user, such as a product investigator or law enforcement officer, does not need to type in numbers or letters in order to authenticate a product or determine whether the product is a counterfeit. For example, the user may simply capture an image or scan the alphanumeric code and/or dot code in order to perform counterfeit detection, where a batch code, including a timestamp, alphanumeric code, and/or dot code is read or determined (e.g., via optical character recognition (OCR)) from the image or scan. This helps drive adoption, because capturing an image or scanning is one of the most basic and informationally rich operations of a smart phone, representing a low-barrier of entry into the system, and including no complicated instructions.

In a particular aspect, a pseudorandom batch code printing and product authentication system is disclosed. The pseudorandom batch code printing and product authentication system comprises: one or more processors, and a batch code printing application (app) comprising computing instructions configured to be executed by the one or more processors. The computing instructions of the batch code printing app, when executed by the one or more processors, may be configured to cause the one or more processors to generate an authenticating sequence of authentic pseudorandom numbers by inputting an initial seed value into a cryptographic algorithm to output an initial authenticating pseudorandom number in the authenticating sequence. The initial seed value may comprise a product date of a first product that is part of a product batch. Each subsequent authenticating pseudorandom number in the authenticating sequence may be generated directly or indirectly from the initial authenticating pseudorandom number whereby the initial authenticating pseudorandom number or a subsequent derivative thereof is input into the cryptographic algorithm to output a next authenticating pseudorandom number of the authenticating sequence. The computing instructions of the batch code printing app, when executed by the one or more processors, may be further configured to cause the one or more processors to generate a first alphanumeric code based on a first set of one or more pseudorandom numbers in the authenticating sequence. The computing instructions of the batch code printing app, when executed by the one or more processors, may be further configured to cause the one or more processors to generate a second alphanumeric code based on a further set of pseudorandom numbers in the authenticating sequence. In addition, the one or more processors may be configured to control a printer to print a first pseudorandom batch code comprising the first alphanumeric code on the first product and a second pseudorandom batch code comprising the second alphanumeric code on a second product. The second product may be part of the product batch.

In still further aspects, the pseudorandom batch code printing and counterfeit detection system may further comprise an authentication application (app) comprising instructions configured to be executed by the one or more processors. The computing instructions of the authentication app, when executed by the one or more processors, may be configured to cause the one or more processors to determine an identified product date and a suspect alphanumeric code from a suspect batch code as printed on a suspect product. The computing instructions of the authentication app, when executed by the one or more processors, may be configured to cause the one or more processors to generate a test sequence of test pseudorandom numbers by inputting the identified product date as a test seed value into the cryptographic algorithm to output an initial test pseudorandom number in the test sequence. In such aspects, each subsequent test pseudorandom number in the test sequence is generated directly or indirectly from the initial test pseudorandom number whereby the initial test pseudorandom number or a subsequent derivative thereof is input into the cryptographic algorithm to output a next test pseudorandom alphanumeric number of the test sequence. The computing instructions of the authentication app, when executed by the one or more processors, may be configured to cause the one or more processors to generate an output comprising one of: (1) an authenticating output indicating that the suspect product is authentic when the suspect alphanumeric code matches a test alphanumeric code derived from at least one test pseudorandom number of the test sequence; or (2) a counterfeit output indicating that the suspect product is counterfeit when the suspect alphanumeric code fails to match a test alphanumeric code derived from at least one test pseudorandom number of the test sequence.

In still further aspects, a pseudorandom batch code printing and product authentication method is disclosed. The pseudorandom batch code printing and product authentication method may comprise generating, by a batch code printing application (app) executing on one or more processors, an authenticating sequence of authentic pseudorandom numbers by inputting an initial seed value into a cryptographic algorithm to output an initial authenticating pseudorandom number in the authenticating sequence. The initial seed value may comprise a product date of a first product that is part of a product batch, wherein each subsequent authenticating pseudorandom number in the authenticating sequence is generated directly or indirectly from the initial authenticating pseudorandom number whereby the initial authenticating pseudorandom number or a subsequent derivative thereof is input into the cryptographic algorithm to output a next authenticating pseudorandom number of the authenticating sequence. The pseudorandom batch code printing and product authentication method may further comprise generating, by the batch code printing app, a first alphanumeric code based on a first set of one or more pseudorandom numbers in the authenticating sequence. The pseudorandom batch code printing and product authentication method may further comprise generating, by the batch code printing app, a second alphanumeric code based on a further set of one or more pseudorandom numbers in the authenticating sequence. The pseudorandom batch code printing and product authentication method may further comprise controlling, by the one or more processors, a printer to print a first pseudorandom batch code comprising the first alphanumeric code on the first product and a second pseudorandom batch code comprising the second alphanumeric code on a second product. The second product may be part of the product batch.

In still further aspects, the pseudorandom batch code printing and counterfeit detection method may further comprise determining, by an authentication application (app) executing on the one or more processors, an identified product date and a suspect alphanumeric code from a suspect batch code as printed on a suspect product. The pseudorandom batch code printing and counterfeit detection method may further comprise generating a test sequence of test pseudorandom numbers by inputting the identified product date as a test seed value into the cryptographic algorithm to output an initial test pseudorandom number in the test sequence. Each subsequent test pseudorandom number in the test sequence may be generated directly or indirectly from the initial test pseudorandom number whereby the initial test pseudorandom number or a subsequent derivative thereof is input into the cryptographic algorithm to output a next test pseudorandom alphanumeric number of the test sequence. The pseudorandom batch code printing and counterfeit detection method may further comprise generating an output comprising one of: (1) an authenticating output indicating that the suspect product is authentic when the suspect alphanumeric code matches a test alphanumeric code derived from at least one test pseudorandom number of the test sequence; or (2) a counterfeit output indicating that the suspect product is counterfeit when the suspect alphanumeric code fails to match a test alphanumeric code derived from at least one test pseudorandom number of the test sequence.

In still further aspects, a tangible, non-transitory computer-readable medium storing instructions for implementing pseudorandom batch code printing and counterfeit detection is disclosed. The instructions, when executed by one or more processors, may cause the one or more processors to generate an authenticating sequence of authentic pseudorandom numbers by inputting an initial seed value into a cryptographic algorithm to output an initial authenticating pseudorandom number in the authenticating sequence. The initial seed value may comprise a product date of a first product that is part of a product batch. Each subsequent authenticating pseudorandom number in the authenticating sequence may be generated directly or indirectly from the initial authenticating pseudorandom number whereby the initial authenticating pseudorandom number or a subsequent derivative thereof is input into the cryptographic algorithm to output a next authenticating pseudorandom number of the authenticating sequence. The instructions, when executed by one or more processors, may cause the one or more processors to generate a first alphanumeric code based on a first set of one or more pseudorandom numbers in the authenticating sequence. The instructions, when executed by one or more processors, may further cause the one or more processors to generate a second alphanumeric code based on a further set of pseudorandom numbers in the authenticating sequence. The instructions, when executed by one or more processors, may further cause the one or more processors to control a printer to print a first pseudorandom batch code comprising the first alphanumeric code on the first product and a second pseudorandom batch code comprising the second alphanumeric code on a second product. The second product may be part of the product batch.

In still further aspects, the instructions, when executed by one or more processors, may further cause the one or more processors to determine an identified product date and a suspect alphanumeric code from a suspect batch code as printed on a suspect product. The instructions, when executed by one or more processors, may further cause the one or more processors to generate a test sequence of test pseudorandom numbers by inputting the identified product date as a test seed value into the cryptographic algorithm to output an initial test pseudorandom number in the test sequence. Each subsequent test pseudorandom number in the test sequence may be generated directly or indirectly from the initial test pseudorandom number whereby the initial test pseudorandom number or a subsequent derivative thereof is input into the cryptographic algorithm to output a next test pseudorandom alphanumeric number of the test sequence. The instructions, when executed by one or more processors, may further cause the one or more processors to generate an output comprising one of: (1) an authenticating output indicating that the suspect product is authentic when the suspect alphanumeric code matches a test alphanumeric code derived from at least one test pseudorandom number of the test sequence; or (2) a counterfeit output indicating that the suspect product is counterfeit when the suspect alphanumeric code fails to match a test alphanumeric code derived from at least one test pseudorandom number of the test sequence.

In accordance with the above, and with the disclosure herein, the present disclosure includes improvements in computer functionality or in improvements to other technologies at least because the disclosure describes that, e.g., a server, or otherwise computing device (e.g., a user computer device), is improved where the ability of the server or computing device is enhanced by a cryptographic algorithm configured to generate authenticating and test sequence of authentic pseudorandom numbers from which corresponding alphanumeric code(s) and/or dot code(s) can be derived. The alphanumeric code(s) and/or dot code(s) can be printed, by a printer, onto corresponding products. The server or computing device does not need to store the alphanumeric code(s) and/or dot code(s), or even the related batch codes, into computer memory or a database for purposes of later performing product authentication as a conventional system would require. Instead, the cryptographic algorithm is stored, where the cryptographic algorithm is a lightweight formula that involves little memory storage. A later request to authenticate a product can then reuse the cryptographic algorithm by inputting the information printed on the product, and without having to access computer memory and/or a database. Overall, this solution results in reduced computer memory requirements, where a server or otherwise computing device does not need to store related batch codes, which is an improvement over prior art systems and methods, especially when batch codes are generated at scale for hundreds of thousands, millions, or even billions of products.

It will be appreciated by those of skill in the art that the cryptographic algorithm, and/or parameters thereof, is a low memory resource used for generating the authenticating sequence of pseudorandom numbers and related alphanumeric codes. Thus, the cryptographic algorithm, and/or parameters thereof may be transmitted over a computer network, and used by the manufacturer/distributor and/or a third party to determine the authenticity of products. That is, in some aspects, the manufacturer/distributor may make the cryptographic algorithm available to third parties (e.g., a retailer) for the third parties' use in determining the authenticity of products. This is provides an improvement to conventional systems that instead require access to and/or transfer to a large set of authenticating batch codes stored in conventional databases.

In addition, the present disclosure includes applying certain of the claim elements with, or by use of, a particular machine, e.g., a printer, including continuous ink jet, thermal ink jet, drop on demand, thermal transfer printers, or laser ablation or other laser marking devices, hot-melt wax printers, for printing anti-counterfeit codes or otherwise features on one or more products or substrates thereof, where such printed codes or otherwise features may then be captured in digital images or scans to detect whether the product is authentic or counterfeit based on the information in the image or from the scan, e.g., the information comprising an alphanumeric code and/or dot code printed on the product.

Still further, an improvement to the underlying printer is achieved with respect to the operation of existing printers because the batch codes of the present invention, with its alphanumeric code and/or dot code, is more compact, thereby reducing the time, and in some cases ink or other substrate material or alternation, needed to physically print the batch code on a product in real-time. This not only allows the printer to print batch codes at a faster line-speed, but also reduces the time a printer needs to print a given number of batch codes. Fewer printers can be used to print a same number of batch codes on given products.

Still further, the compact form of the batch codes of the present invention, with its alphanumeric code and/or dot code, allows for a printer to print on smaller surface areas of physical products. This results in improvements to physical product designs, shapes, and/or configurations, as the compact batch codes takes less space or material on a substrate of given product and its shape.

In addition, the present disclosure includes specific features other than what is well-understood, routine, conventional activity in the field, or adds unconventional steps that confine the claim to a particular useful application, e.g., pseudorandom batch code printing and product authentication systems and methods for confirming product authentication and detecting product counterfeiting as described herein.

Advantages will become more apparent to those of ordinary skill in the art from the following description of the preferred aspects which have been shown and described by way of illustration. As will be realized, the present aspects may be capable of other and different aspects, and their details are capable of modification in various respects. Accordingly, the drawings and description are to be regarded as illustrative in nature and not as restrictive.

BRIEF DESCRIPTION OF THE DRAWINGS

The Figures described below depict various aspects of the system and methods disclosed therein. It should be understood that each Figure depicts an aspect of a particular aspect of the disclosed system and methods, and that each of the Figures is intended to accord with a possible aspect thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present aspects are not limited to the precise arrangements and instrumentalities shown, wherein:

FIG. 5A illustrates an example character identity lookup table, in accordance with various aspects disclosed herein.

The Figures depict preferred aspects for purposes of illustration only. Alternative aspects of the systems and methods illustrated herein may be employed without departing from the principles of the invention described herein.

DETAILED DESCRIPTION OF THE INVENTION

Figure 1A:
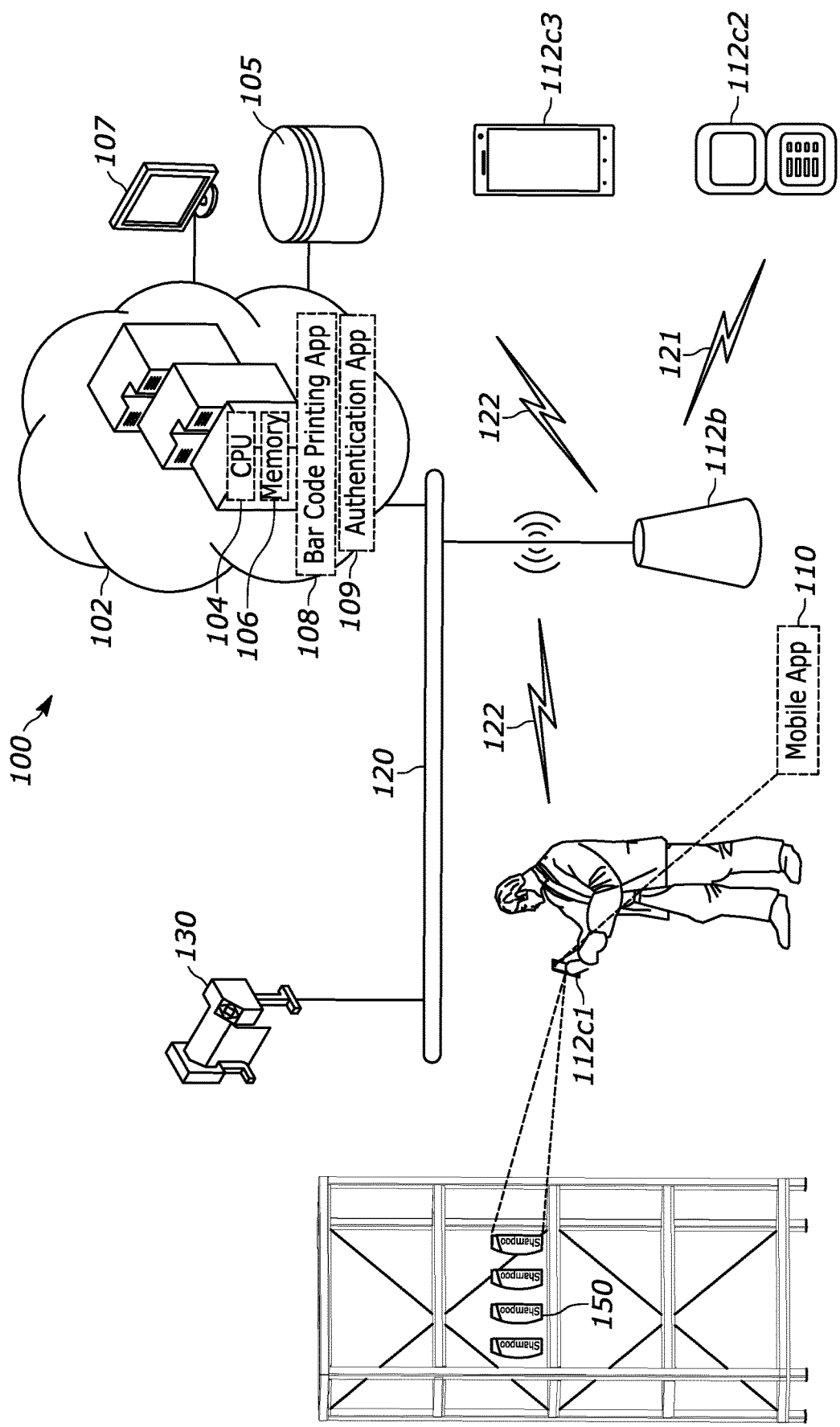
FIG. 1A illustrates an example pseudorandom batch code printing and product authentication system, in accordance with various aspects disclosed herein.

FIG. 1A illustrates an example pseudorandom batch code printing and product authentication system 100, in accordance with various aspects disclosed herein. In the example aspect of FIG. 1A, the pseudorandom batch code printing and product authentication system 100 includes server(s) 102, which may comprise one or more computer servers. In various aspects, server(s) 102 comprise multiple servers, which may comprise multiple, redundant, or replicated servers as part of a server farm. In still further aspects, server(s) 102 may be implemented as cloud-based servers, such as a cloud-based computing platform. For example, server(s) 102 may be any one or more cloud-based platform(s) such as MICROSOFT AZURE, AMAZON AWS, or the like. Server(s) 102 may include one or more processor(s) 104 as well as one or more computer memory 106.

Memory 106 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. Memory 106 may store an operating system (OS) (e.g., Microsoft Windows, Linux, UNIX, etc.) capable of facilitating the functionalities, apps, methods, or other software as discussed herein. Memory 106 may also store a batch code printing application (app) 108 and/or authentication app 109, which may each comprise computing instructions for pseudorandom batch code printing and product authentication, respectively, as described herein. As described herein, batch code printing app 108 and/or authentication app 109 are accessible, across a computer network (e.g., computer network 120), by a user computing device (e.g., user computing device 112c1), for example through communication via mobile app 110 and/or via an application programming interface (API) such as a representational state transfer (RESTful) API.

In addition, memory 106 may also store machine readable instructions, including any of one or more application(s), one or more software component(s), and/or one or more application programming interfaces (APIs), which may be implemented to facilitate or perform the features, functions, or other disclosure described herein, such as any methods, processes, elements or limitations, as illustrated, depicted, or described for the various flowcharts, illustrations, diagrams, figures, and/or other disclosure herein. For example, at least some of the applications, software components, or APIs may be, include, otherwise be part of, a bar code printing app 108 and/or an authentication app 109, where each may be configured to facilitate their various functionalities discussed herein.

Additionally, or alternatively, batch code printing app 108 and/or authentication app 109 may be stored in database 105, which is accessible or otherwise communicatively coupled to server(s) 102. It should be appreciated that one or more other applications are envisioned, that may be in addition to the batch code printing app 108 and/or an authentication app 109, and that may be executed by the processor(s) 104. For example, the one or more APIs may provide, for example, third party access to a counterfeit product list stored in the database 105. For example, the counterfeit product list may comprise a list of known counterfeit codes that counterfeiters have previously used on counterfeit products.

The processor(s) 104 may be connected to the memory 106 via a computer bus (not depicted) responsible for transmitting electronic data, data packets, or otherwise electronic signals to and from the processor(s) 104 and memory 106 in order to implement or perform the machine readable instructions, methods, processes, elements or limitations, as illustrated, depicted, or described for the various flowcharts, illustrations, diagrams, figures, and/or other disclosure herein.

Processor(s) 104 may interface with memory 106 via the computer bus to execute an operating system (OS). Processor(s) 104 may also interface with the memory 106 via the computer bus to create, read, update, delete, or otherwise access or interact with the data stored in memory 106 and/or the database 105 (e.g., a relational database, such as Oracle, DB2, MySQL, or a NoSQL based database, such as MongoDB). The data stored in memory 106 and/or database 105 may include all or part of any of the data or information described herein, including, for example, font set table(s), codes, images, or other images and/or information, artwork, product labels, graphics, logos, or the like, or as otherwise described herein, in addition to the counterfeit product list.

Server(s) 102 may further include a communication component configured to communicate (e.g., send and receive) data via one or more external/network port(s) to one or more networks or local terminals, such as computer network 120 and/or a terminal 107 (for rendering or visualizing) described herein. In some aspects, server(s) 102 may include a client-server platform technology such as ASP.NET, Java J2EE, Ruby on Rails, Node.js, a web service or online API, responsive for receiving and responding to electronic requests. The server(s) 102 may implement the client-server platform technology that may interact, via the computer bus, with the memory(s) 106 (including the applications(s), component(s), API(s), data, etc. stored therein) and/or database 105 to implement or perform the machine readable instructions, methods, processes, elements or limitations, as illustrated, depicted, or described for the various flowcharts, illustrations, diagrams, figures, and/or other disclosure herein.

In various aspects, the server(s) 102 may include, or interact with, one or more transceivers (e.g., WWAN, WLAN, and/or WPAN transceivers) functioning in accordance with IEEE standards, 3GPP standards, or other standards, and that may be used in receipt and transmission of data via external/network ports connected to computer network 120. In some aspects, computer network 120 may comprise a private network or local area network (LAN). Additionally, or alternatively, computer network 120 may comprise a public network such as the Internet.

Server(s) 102 may further include or implement an operator interface configured to present information to an administrator or operator and/or receive inputs from the administrator or operator. An operator interface may provide a display screen (e.g., via the terminal 107). Server(s) 102 may also provide I/O components (e.g., ports, capacitive or resistive touch sensitive input panels, keys, buttons, lights, LEDs), which may be directly accessible via, or attached to, server(s) 102 or may be indirectly accessible via or attached to the terminal 107. According to some aspects, an administrator or operator may access the server 102 via the terminal 107 to review information, make changes, input training data or images, execute batch code printing app 108, execute authentication app 109, and/or perform other functions.

As described herein, in some aspects, server(s) 102 may perform the functionalities as discussed herein as part of a "cloud" network or may otherwise communicate with other hardware or software components within the cloud to send, retrieve, or otherwise analyse data or information described herein.

In general, a computer program or computer based product, application (app) (e.g., batch code printing app 108 and/or authentication app 109), or code, or other computing instructions described herein may be stored on a computer usable storage medium, or tangible, non-transitory computer-readable medium (e.g., standard random access memory (RAM), an optical disc, a universal serial bus (USB) drive, or the like) having such computer-readable program code or computer instructions embodied therein, wherein the computer-readable program code or computer instructions may be installed on or otherwise adapted to be executed by the processor(s) 104 (e.g., working in connection with the respective operating system in memory 106) to facilitate, implement, or perform the machine readable instructions, methods, processes, elements or limitations, as illustrated, depicted, or described for the various flowcharts, illustrations, diagrams, figures, and/or other disclosure herein. In this regard, the program code may be implemented in any desired program language, and may be implemented as machine code, assembly code, byte code, interpretable source code or the like (e.g., via Golang, Python, C, C++, C#, Objective-C, Java, Scala, ActionScript, JavaScript, HTML, CSS, XML, etc.).

As shown in FIG. 1, server(s) 102 are communicatively connected, via computer network 120 to the one or more user computing devices 112 via base station 112*b*. In some aspects, base station 112*b* may comprise a cellular base station, such as cell tower(s), communicating to the one or more user computing devices 112*c*1-112*c*3 via wireless communications 121 based on any one or more of various mobile phone standards, including NMT, GSM, CDMA, UMMTS, LTE, 5G, or the like. Additionally or alternatively, a base station 112*b* may comprise one or more comprise routers, wireless switches, or other such wireless connection points communicating to the one or more user computing devices 112*c*1-112*c*3 via wireless communications 122 based on any one or more of various wireless standards, including by non-limiting example, IEEE 802.11a/b/c/g (WIFI), the BLUETOOTH standard, or the like.

Any of the one or more user computing devices 112*c*1-112*c*3 may comprise mobile devices and/or client devices for accessing and/or communicating with server(s) 102. Such mobile devices may comprise one or more mobile processor(s) and/or a digital camera for capturing images, such as images as described herein (e.g., images of product and/or codes, such as batch codes, alphanumeric codes, or other information as described herein). In various aspects, user computing devices 112c1-112c3 may comprise a mobile phone (e.g., a cellular phone), a tablet device, a personal data assistance (PDA), a wearable device, or the like, including, by non-limiting example, an APPLE iPhone or iPad device or a GOOGLE ANDROID based mobile phone or tablet.

In additional aspects, user computing devices 112c1-112c3 may comprise a retail computing device. A retail computing device may comprise a user computer device configured in a same or similar manner as a mobile device, e.g., as described herein for user computing devices 112c1-112c3, including having a processor and memory, for implementing, or communicating with (e.g., via server(s) 102), as described herein. Additionally, or alternatively, a retail computing device may be located, installed, or otherwise positioned within a retail environment to allow users and/or customers of the retail environment to utilize the pseudorandom batch code printing and product authentication systems and methods on site within the retail environment. For example, the retail computing device may be installed within a kiosk for access by a user. The user may then upload or transfer images or scan information (e.g., from a user mobile device) to the kiosk to implement the pseudorandom batch code printing and product authentication described herein. Additionally, or alternatively, the kiosk may be configured with a camera or scanner to allow the user to take new images or scans to detect counterfeit product(s) and/or for upload and transfer to server(s) 102. In such aspects, the user would be able to use the retail computing device to receive and/or have rendered an indication of whether the product is authentic or counterfeit, as described herein, on a display screen of the retail computing device.

In various aspects, the one or more user computing devices 112c1-112c3 may implement or execute an operating system (OS) or mobile platform such as APPLE's iOS and/or GOOGLE'S ANDROID operation system. Any of the one or more user computing devices 112c1-112c3 may comprise one or more processors and/or one or more memory for storing, implementing, or executing computing instructions or code, which may comprise or be a part of a mobile application (app) (e.g., mobile app 110), as described in various aspects herein. For example, mobile app 110 may be installed on, or be executed on, a user computing device (e.g., user computing device 112c2). Mobile app 110 may be a downloadable app, e.g., from server(s) 102 or an app store, such as the APPLE APP store or GOOGLE PLAY store. As shown in FIG. 1A, mobile app 110 as described herein may be stored locally on a memory of a user computing device (e.g., user computing device 112c1). Mobile app 110 may comprise computing instructions implemented on user computing device 112c1. In some aspects, mobile app 110 may interact with batch code printing app 108 and/or authentication app 109. For examples, in some aspects, mobile app 110 may comprise a client-device portion implemented on a user computing device (e.g., user computing device 112c2) that communicates, across computer network 120, to send and/or receive instructions from a server-side portion (e.g., batch code printing app 108 and/or authentication app 109) implemented on server(s) 102. In addition, any of mobile app 110, batch code printing app 108, and/or authentication app 109 may send instructions across computer network to printer 130 for controlling printer 130.

User computing devices 112c1-112c3 may comprise a wireless transceiver to receive and transmit wireless communications 121 and/or 122 to and from base station 112b. In various aspects, pixel based images (e.g., images depicting codes, such as batch code(s) and/or alphanumeric code(s)) or scan data comprising batch code information may be transmitted via computer network 120 to server(s) 102 for analysis as described herein.

Figure 2A:
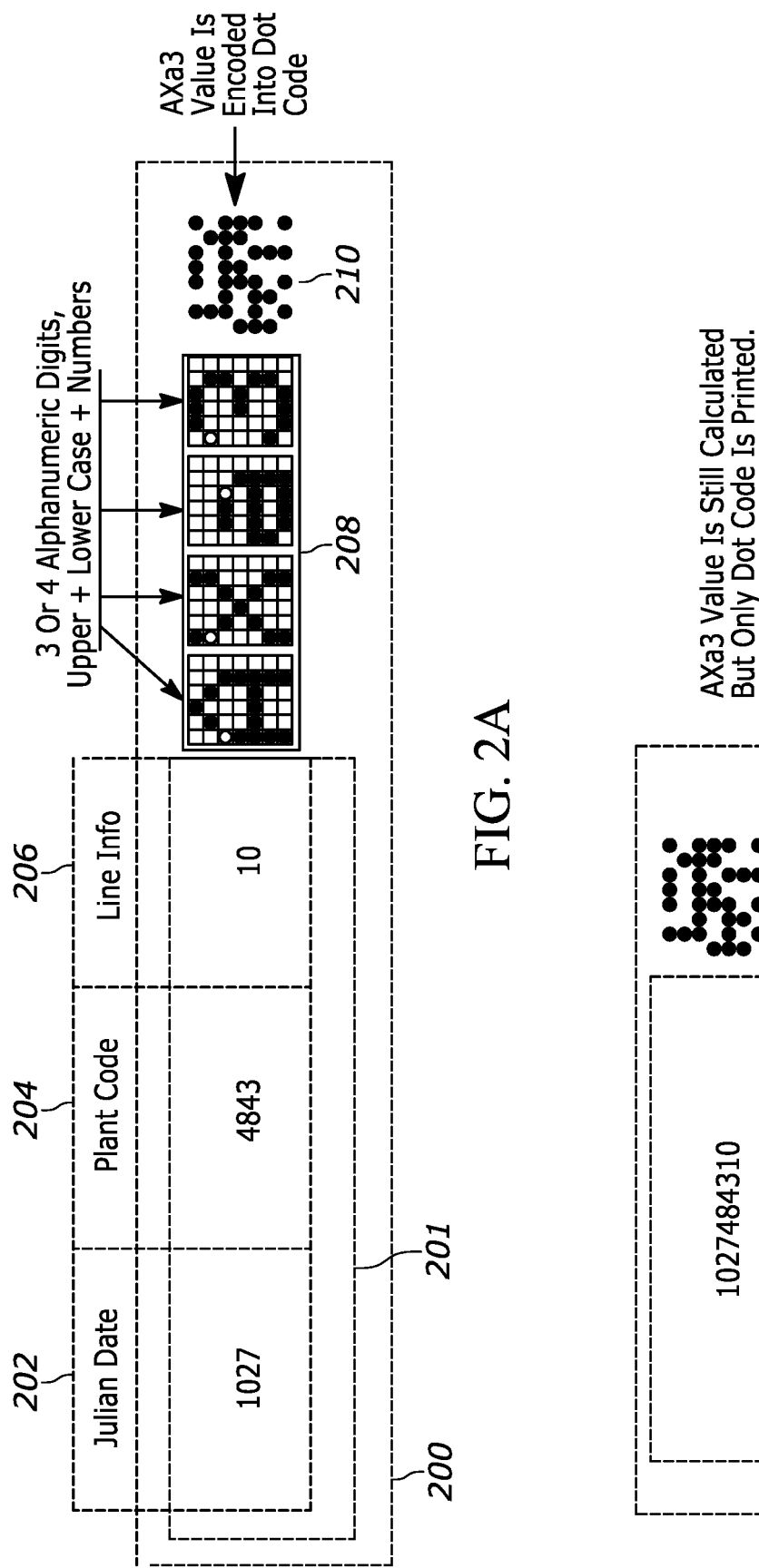
FIG. 2A illustrates an example batch code as generated by pseudorandom batch code printing and product authentication systems and methods, in accordance with various aspects disclosed herein.

In addition, the one or more user computing devices 112c1-112c3 may include a digital camera and/or digital video camera for capturing or taking digital images and/or frames (e.g., which can be any one or more of images, such as batch code 200 as shown in FIG. 2A). Each digital image may comprise pixel data that may be analysed, e.g., to determine whether a product is authentic and/or inauthentic as described herein. For example, a digital camera and/or digital video camera of, e.g., any of user computing devices 112c1-112c3, may be configured to take, capture, or otherwise generate digital images of products and, at least in some aspects, may store such images in a memory of a respective user computing devices. Additionally, or alternatively, user computing devices 112c1-112c3 may also include a scanner for scanning alphanumeric codes and/or dot codes as described herein. Such digital images and/or scan data can be transmitted to and/or stored on memory 106 and/or database 105 of server(s) 102, e.g., for analysis as described herein.

Still further, each of the one or more user computer devices 112c1-112c3 may include a display screen for displaying graphics, images, text, product authentication or counterfeit information, data, pixels, features, and/or other such visualizations or information as described herein. In various aspects, graphics, images, text, product authentication or counterfeit information, data, pixels, features, and/or other such visualizations or information may be received from server(s) 102 for display on the display screen of any one or more of user computer devices 112c1-112c3. Additionally, or alternatively, a user computer device may comprise, implement, have access to, render, or otherwise expose, at least in part, an interface or a graphic user interface (GUI) for displaying text and/or images on its display screen.

The user may use the computing device 112c1, for example, to capture one or more images of a product. As shown for FIG. 1A, the image may be an image of a product of a product batch (e.g., product batch 150). An image corresponding to a product of the product batch 150 may be any suitable product of the manufacturer/distributor, such as a baby care product, a fabric care product, a family care product, a feminine care product, a grooming product, a hair care product, a home care product, an oral care product, a personal health care product, a skin and personal care product, a clear product, and/or other similar consumer product(s).

In some aspects, computing instructions and/or applications executing at the server (e.g., server(s) 102) and/or at a mobile device (e.g., mobile device 112c1) may be communicatively connected for analysing pixel data of an image and/or scan data (e.g., of the batch code 200 of FIG. 2A and/or the batch code 250) for detecting whether a corresponding product is authentic or counterfeit, as described herein. For example, one or more processors (e.g., processor(s) 104) of server(s) 102 may be communicatively coupled to a mobile device via a computer network (e.g., computer network 120). In such aspects, batch code printing app 108 and/or authentication app 109 may comprise a server app portion configured to execute on the one or more processors of the server (e.g., server(s) 102). Similarly, mobile app 110 may comprise a mobile app portion configured to execute on one or more processors of the mobile device (e.g., any of one or more user computing devices 112c1-112c3). In such aspects, the server app portion is configured to communicate with the mobile app portion. The server app portion or the mobile app portion may each be configured to implement, or partially implement, one or more of: (1) generating an authenticating sequence of authentic pseudorandom numbers by inputting an initial seed value into a cryptographic algorithm to output an initial authenticating pseudorandom number in the authenticating sequence; (2) generating a first alphanumeric code based on a first set of one or more pseudorandom numbers in the authenticating sequence; (3) generating a second alphanumeric code based on a further set of one or more pseudorandom numbers in the authenticating sequence; (4) controlling a printer to print a first pseudorandom batch code comprising the first alphanumeric code on the first product and a second pseudorandom batch code comprising the second alphanumeric code on a second product, wherein the second product is part of the product batch; (5) determining an identified product date and a suspect alphanumeric code from a suspect batch code as printed on a suspect product; (6) generating a test sequence of test pseudorandom numbers by inputting the identified product date as a test seed value into the cryptographic algorithm to output an initial test pseudorandom number in the test sequence; and/or (7) generating an output comprising one of: an authenticating output and/or a counterfeit output, as described herein.

FIG. 1A further comprises printer 130. In various aspects, printer 130 is connected via network 120 to server(s) 102 and may receive print submissions or commands to print product code(s), steganographic features, batch codes, or other features on products and/or substrates of products. For example, printer 130 may comprise an online printer and may be configured for printing in various mediums or in different ways (e.g., continuous inkjet, laser, thermal transfer, embossed, etc.). In some aspects, printer 130 is a printer under the direction or control of the owner or operator of server(s) 102, and/or a user computing device (e.g., user computing device 112c1) where printer 130 is part of a same network. In other aspects, printer may be a printer under the direction or control of a third-party and may be connected to server(s) 102 via the Internet. Herein, a batch code generally comprises a code having information and/or graphical elements (e.g., a timestamp, plant code, line number, alphanumeric code, dot code, or as otherwise described herein).

Printer 130 is controlled to print a batch code, or otherwise product code, on a product or otherwise substrate of product. Printer 130 may comprise a continuous ink jet printer, a thermal ink jet printer, a drop on demand printer, a thermal transfer printer, hot-melt wax printer, and/or a laser ablation printer or other laser marking device. In a preferred aspect, a printer may be configured to enable determination and/or printing of the alphanumeric digits on a product or substrate thereof. For example, in one example, a printer manufactured by DOMINO is modified, for example configured via software for controlling the printer, to determine and print of the alphanumeric digits. A further aspect could be the use of a digital artwork printer to print a code. The substrate may be any desired substrate, including porous and non-porous materials, a primary and secondary packaging material, and/or, generally, the products themselves, typically consumer products. In some aspects, a printer (e.g., printer 130) may be controlled by the batch code printing app 108 to generate a pseudo-random sequence of numbers and print batch codes on respective products. These numbers may then be used to select or otherwise determine the alphanumeric code and for printing on the substrate and/or product as described herein for FIGS. 1B and 1C.

Figure 1B:
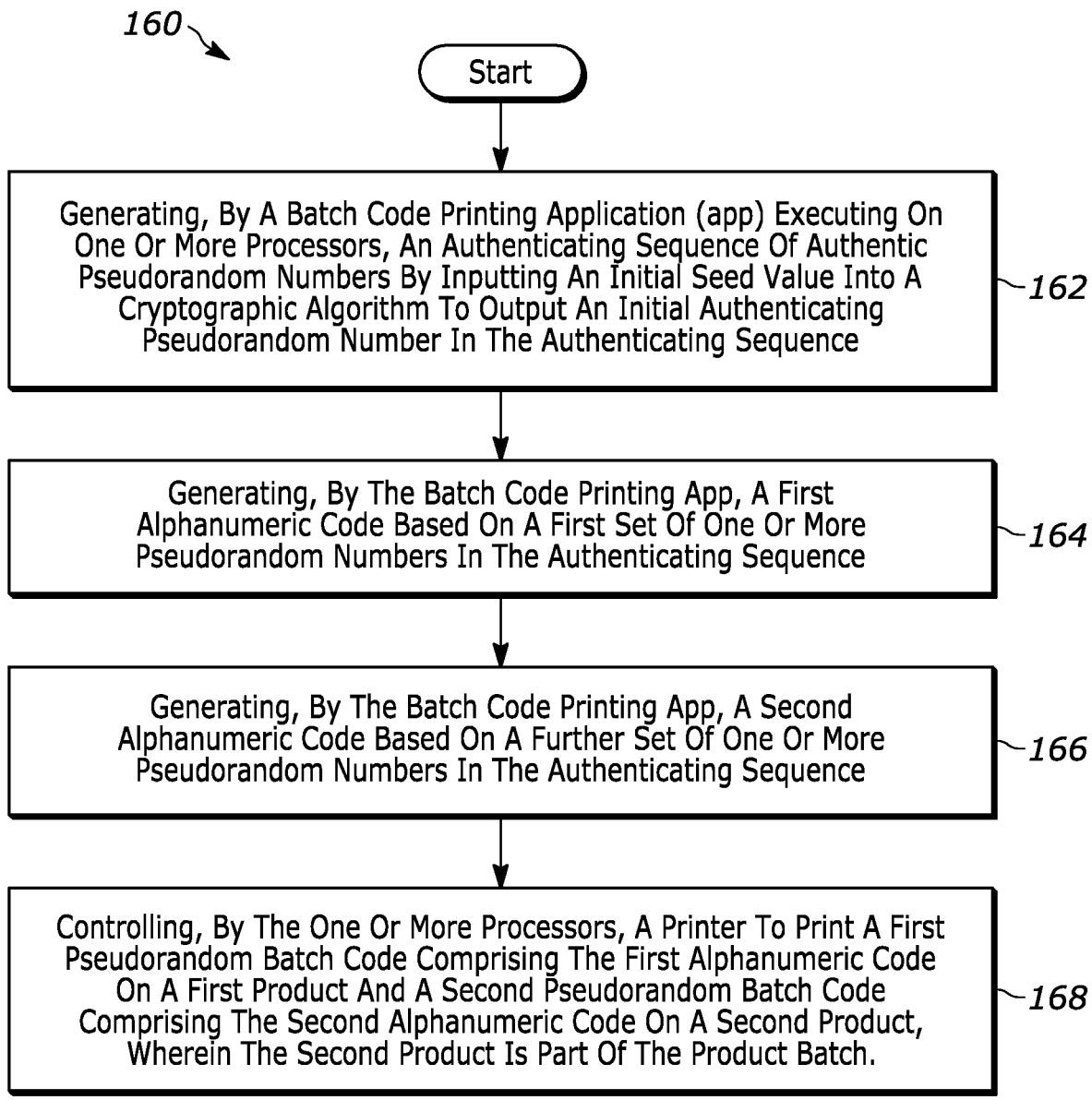
FIG. 1B illustrates an example pseudorandom batch code printing and product authentication method, in accordance with various aspects disclosed herein.

FIG. 1B illustrates an example pseudorandom batch code printing and product authentication method 160, in accordance with various aspects disclosed herein. Generally, method 160 comprises an initial batch code printing algorithm or process using a pseudorandom number.

At block 162, method 160 comprises generating, by a batch code printing application (app) (e.g., batch code printing app 108) executing on one or more processors (e.g., processor(s) 104), an authenticating sequence of authentic pseudorandom numbers. By way of non-limiting example, a sequence of pseudorandom numbers may be generated by a pseudorandom number generator (PRNG), which may also be known as a deterministic random bit generator (DRBG). More generally, a PRNG comprises an algorithm for generating a sequence of numbers that are, or that approximate the properties of, a sequences of random numbers. A PRNG-generated sequence is determined by an initial value, referred to herein as an initial seed value or otherwise seed. In various aspects, batch code printing app 108 may comprise a PRNG for generating the authenticating sequence of authentic pseudorandom numbers. It is to be understood that different and/or additional random number generators may be used to generate a sequence of pseudorandom numbers.

The authenticating sequence of authentic pseudorandom numbers may be generated by inputting, e.g., by batch code printing app 108, an initial seed value into a cryptographic algorithm (e.g., cryptographic algorithm 300) to output an initial authenticating pseudorandom number in the authenticating sequence.

In various aspects, the initial seed value may comprise a product date (e.g., product date 201 of FIG. 2A) corresponding to the date of manufacture of, or otherwise associated with, a product that is part of a product batch (e.g., product batch 150).

Additionally, or alternatively, an initial seed value may comprise one or more values associated with a given product, where such values may be selected from: a manufacturing plant ID code (e.g., plant code 204 of FIG. 2A), manufacturing line information (e.g., line info 206 of FIG. 2A), batch number information (e.g., information representing a grouping of products in a particular batch of products, such as product batch 150), or combinations thereof. It is to be understood, however, that additional and/or different values, information, and/or data may be used for, or for determining, an initial seed value.

In various aspects, each subsequent authenticating pseudorandom number in an authenticating sequence may be generated directly or indirectly from the initial authenticating pseudorandom number (e.g., the first number output by cryptographic algorithm). Subsequent numbers in the authenticating sequence may be similarly generated. For example, the initial authenticating pseudorandom number or a subsequent derivative thereof is input into the cryptographic algorithm to output a next authenticating pseudorandom number of the authenticating sequence. That is, each authenticating pseudorandom number (following the initial authenticating pseudorandom number) is generated by inputting a previous authenticating pseudorandom number into cryptographic algorithm. For example, a second authenticating pseudorandom number is generated as output by inputting the initial authenticating pseudorandom number into the cryptographic algorithm 300; a third authenticating pseudorandom number is generated as output by inputting the second authenticating pseudorandom number into the cryptographic algorithm 300, and so on. The cryptographic algorithm 300 is further described herein for FIG. 3.

At block 164, method 160 comprises generating, by the batch code printing app (e.g., batch code printing app 108), a first alphanumeric code (e.g., "AXa3" as shown for FIG. 3) based on a first set of one or more pseudorandom numbers in the authenticating sequence, which in the example of FIG. 1B, includes the initial authenticating pseudorandom number. Generally, an alphanumeric code (e.g., such as the first alphanumeric code) may comprise one or more values of one or more alphanumeric digits and/or characters, which are each derived from pseudorandom numbers of a given sequence (e.g., an authenticating sequence and/or a test sequence). In various aspects, an alphanumeric code preferably comprises four characters, which may be digits or alpha characters, an example of which is "AXa3," as shown herein for FIGS. 2A, 2B, and 3. An alphanumeric code may be printed as part of, or otherwise with, a batch code on a product or surface or substrate thereof. An advantage of the alphanumeric code is it allows compact information to be printed with, or as part of, a batch code, and without using lengthy character or data outputs that could take up or require large amounts of surface space on a substrate or otherwise surface of a product.

At block 166, method 160 comprises generating, by the batch code printing app (e.g., batch code printing app 108), a second alphanumeric code (e.g., "J8V3" as shown for FIG. 3) based on a further set of one or more pseudorandom numbers in the authenticating sequence. For example, the second alphanumeric code may be generated based on a second pseudorandom number in the authenticating sequence, which was generated by inputting the second pseudorandom number in the authenticating sequence into cryptographic algorithm 300.

Figure 2B:
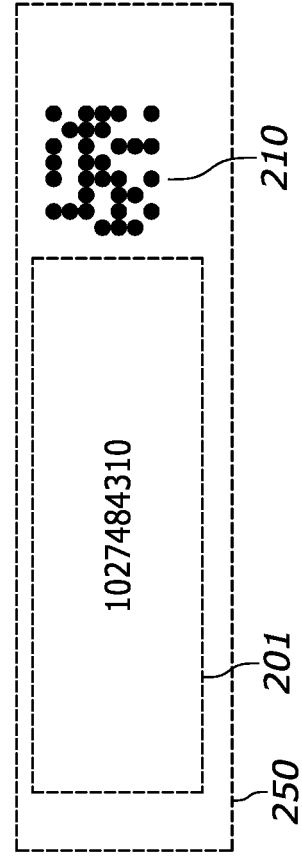
FIG. 2B illustrates a further example batch code as generated by pseudorandom batch code printing and product authentication systems and methods, in accordance with various aspects disclosed herein.
Figure 3:
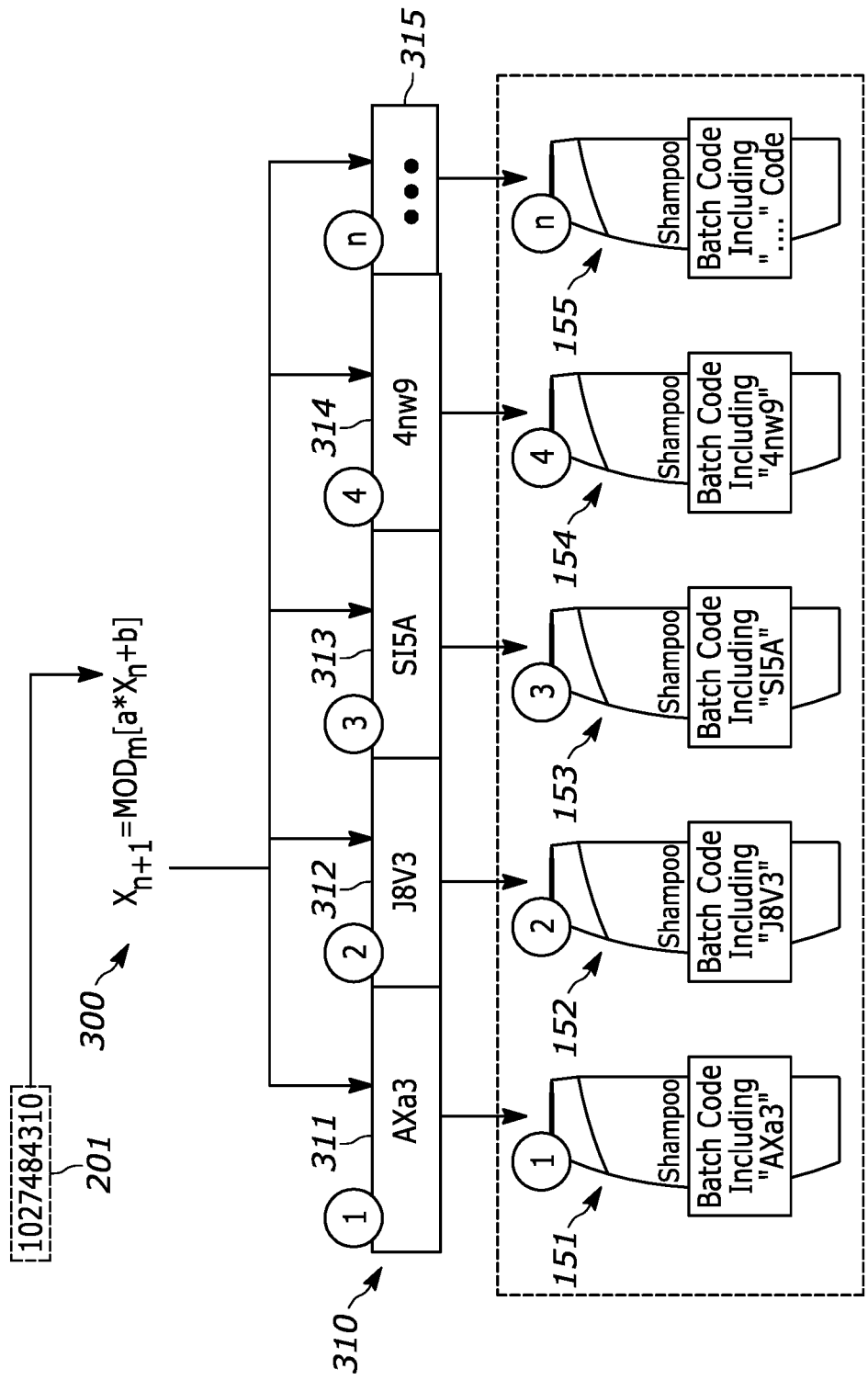
FIG. 3 illustrates an example cryptographic algorithm used to generate a sequence of pseudorandom alphanumeric values, in accordance with various aspects disclosed herein.

At block 168, method 160 comprises controlling, by the one or more processors, a printer to print a first pseudorandom batch code (e.g., batch code 200) comprising the first alphanumeric code (e.g., pseudorandom alphanumeric code 208 of FIG. 2A or pseudorandom alphanumeric code 311, each shown as "AXa3") on the first product (e.g., product 151 as shown for FIG. 3). Method 160 comprises controlling, by the one or more processors, a printer to print a second pseudorandom batch code comprising the second alphanumeric code (e.g., pseudorandom alphanumeric code 312 shown as "J8V3") on a second product (e.g., product 151 as shown for FIG. 3). Each of the first product and the second product may be part of a same product batch (e.g., product batch 150). In some aspects, an alphanumeric code (e.g., such as the first alphanumeric code and/or a second alphanumeric code) may comprise a dot code (e.g., dot code 210) as described further herein for example for FIGS. 2A and 2B.

In various aspects, the first product and the second product may be packaged as part of a package or unit of products (e.g., product batch 150) each having a sequence of alphanumeric codes, for example, as shown and described for FIG. 3.

Figure 1C:
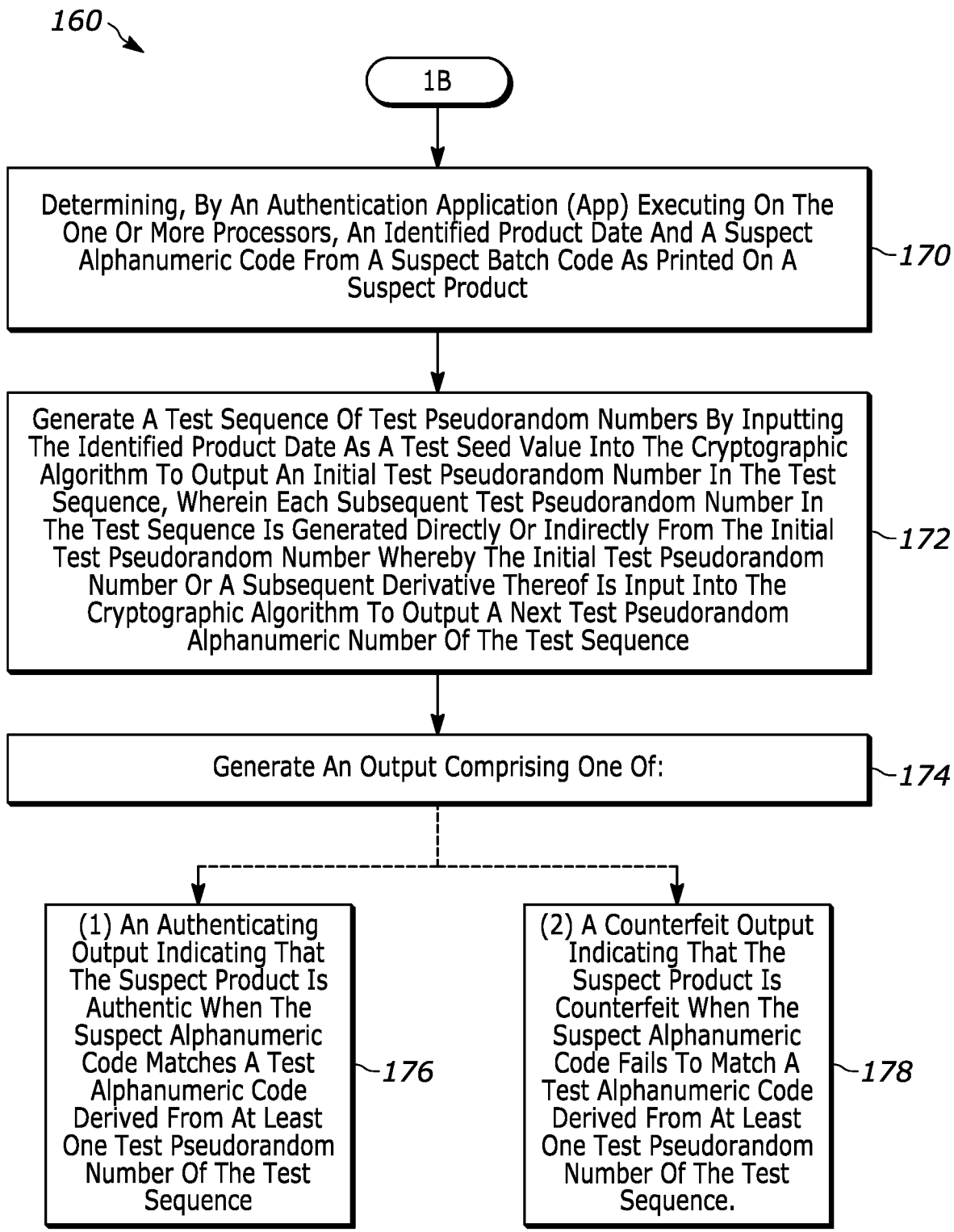
FIG. 1C further illustrates the example pseudorandom batch code printing and product authentication method of FIG. 1B, in accordance with various aspects disclosed herein.

FIG. 1C further illustrates the example pseudorandom batch code printing and product authentication method 160 of FIG. 1B, in accordance with various aspects disclosed herein. Blocks 170 to 178 of method 160 illustrate authentication of products and/or detection of counterfeit products based on the batch codes generated and printed as described for blocks 162 to 168 of method 160.

At block 170, method 160 comprises determining, by an authentication application (app) (e.g., authentication app 109) executing on the one or more processors (e.g., processor(s) 104), an identified product date and a suspect alphanumeric code from a suspect batch code as printed on a suspect product. The suspect product may be positioned on a shelf and/or in a warehouse (or other storage location) at a retail location. For example, as shown for FIG. 1A, a user can capture of an image of the suspect batch code on the suspect product using a camera of a user computing device (e.g., computing device 112c1).

At block 172, method 160 comprises generating a test sequence of test pseudorandom numbers by inputting the identified product date as a test seed value into the cryptographic algorithm (e.g., cryptographic algorithm 300) to output an initial test pseudorandom number in the test sequence.

In various aspects, the test seed value may comprise a product date (e.g., product date 201 of FIG. 2A) of a product that is part of a product batch (e.g., product batch 150).

Additionally, or alternatively, a test seed value may comprise one or more values associated with a given product, where such values may be selected from: a manufacturing plant ID code (e.g., plant code 204 of FIG. 2A), manufacturing line information (e.g., line info 206 of FIG. 2A), or batch number information (e.g., information representing a grouping of products in a particular batch of products, such as product batch 150). It is to be understood, however, that different and/or additional values, information, and/or data may be used for, or for determining, a test seed value.

In various aspects, the test sequence can be generated in the same manner as the authenticating sequence described herein for block 162 of method 160. That is, each subsequent test pseudorandom number in the test sequence may be generated directly or indirectly from the initial test pseudorandom number whereby the initial test pseudorandom number or a subsequent derivative thereof is input into the cryptographic algorithm to output a next test pseudorandom alphanumeric number of the test sequence. That is, each test pseudorandom number (following the initial test pseudorandom number) is generated by inputting a previous test pseudorandom number into cryptographic algorithm. For example, a second test pseudorandom number is generated as output by inputting the initial test pseudorandom number into the cryptographic algorithm 300, a third test pseudorandom number is generated as output by inputting the second test pseudorandom number into the cryptographic algorithm 300, and so on. The cryptographic algorithm 300 is further described herein for FIG. 3.

When a cryptographic algorithm is configured (e.g., has the same parameters) for generation of a test sequence as it had been configured for generating the authenticating sequence, then the output of the cryptographic algorithm will be the same (e.g., will result in the same sequence). In this way, the test sequence, at least in aspects where the test seed value is an authentic seed (e.g., an authentic date), then generation of the test sequence may be considered as a reverse engineered or reconstructed sequence that is bootstrapped from the seed value alone. This improves over existing systems because memory resources (e.g., memory 106 and/or database 105) are freed from having to store records of authentic codes. Instead, authentication and counterfeit detection may be determined based on the initial seed value, test seed value, and/or cryptographic algorithm without the requirement storing authentic codes in memory.

At block 174, method 160 comprises generating an output comprising one of an authenticating output or a counterfeit output. The outputs are specific to the product being imaged, scanned, detected, or otherwise inspected, e.g., by a user using a computing device (e.g., computing device 112c1) to capture an image of a product. For example, in various aspects, a mobile application (app) (e.g., mobile app 110) comprising computing instructions configured to be executed by a device processor of a mobile device (e.g., computing device 112c1) can be executed by the device processor to capture, by a camera or scanner of the mobile device (e.g., computing device 112c1), an image or scan data of a batch code (e.g., a suspect batch code) as printed on a suspect product. An identified product date and/or otherwise seed value may be determined from the image or scan data of the batch code. For example, the image or scan data may be analysed to extract the batch code, including the suspect alphanumeric code. Image extraction of the suspect alphanumeric code may be performed via optical character recognition (OCR) or scanning, although it is to be understood that additional and/or different imaging methods may be used.

At block 176 of method 160, based on analysis of an image or scan data of a suspect product, an authenticating output may be generated (e.g., by authentication app 109) indicating that the suspect product is authentic when the suspect alphanumeric code matches a test alphanumeric code derived from at least one test pseudorandom number of the test sequence. In cases where the authenticating output is generated, then the suspect alphanumeric code (e.g., "AXa3") is authentic because it was generated previously by cryptographic algorithm 300 using the same seed value. That is, the initial seed value and the test seed value are the same (e.g., having a same date value, e.g., 1027 as shown for FIG. 2A). This is because both values are equal and when each are input into cryptographic algorithm 300, then a same sequence (e.g., sequence 310 of FIG. 3) of pseudorandom numbers are generated and can be matched. The matching of the pseudorandom numbers, being in the same sequence (even though generated at different times), indicates that the product is authentic, and results in the authenticating output.

Alternatively, at block 178 of method 160, a counterfeit output may be generated indicating that the suspect product is counterfeit when the suspect alphanumeric code fails to match a test alphanumeric code derived from at least one test pseudorandom number of the test sequence. For example, a counterfeit output is generated when the suspect alphanumeric code (e.g., "123A") on a suspect product does not match any one of the alphanumeric codes in the sequence (e.g., sequence 310) as generated, e.g., by batch code printing app 108. The counterfeit code is identified because it falls outside of the authenticating sequence of codes (e.g., sequence 310).

Additionally or alternatively, the authentication and/or counterfeit output may be determined by submitting one or both of the suspect batch code and/or the suspect alphanumeric code to an authentication database comprising a list of known counterfeit batch codes (e.g., a "bad list" of codes). This may be performed, for example, where it is expected that a counterfeiter may take a subset of valid codes and print them many times on the counterfeited product. Although, it is to be understood, that such determination may be made for other purposes. The authentication database may be a database (e.g., database 105) communicatively coupled to and/or accessible via servers 102. In such aspects, database comprises a list (e.g., bad list) of known copied or counterfeit codes that may include a batch code and/or the alphanumeric code. Authentication app 109 may analyse the suspect batch code and/or the suspect alphanumeric code to detect a counterfeit code by comparing the suspect batch code and/or the suspect alphanumeric code to a listing of known counterfeit batch codes and/or alphanumeric codes in the database (e.g., database 105).

The authentication app 109 can be executed to check whether one or more of the batch code and/or the suspect alphanumeric code is found in the known counterfeit batch codes. The counterfeit output is provided in response (e.g., to the mobile app 110) when the one or both of the suspect batch code and the suspect alphanumeric code match at least one known counterfeit batch code identified within the known counterfeit batch codes. Alternatively, the authenticating output is provided in response (e.g., to mobile app 110) when the one or both of the suspect batch code and the suspect alphanumeric code fail to match at least one of the authenticating sequence of codes (e.g., sequence 310).

FIG. 2A illustrates an example batch code 200 as generated by pseudorandom batch code printing and product authentication systems and methods, in accordance with various aspects disclosed herein. The batch code 200 may be printed on a product by a printer (e.g., printer 130).

In the example of FIG. 2A, batch code 200 comprises a date of manufacture 202 (e.g., "1027"). The date of manufacture represents a date when the product (e.g., a bottle of shampoo) was manufactured, which is Jan. 27, 2021 in the example of FIG. 2A. In addition, batch code 200 comprises a plant code 204 (e.g., plant "4843"), which indicates an identifier of the plant where the product was manufactured. Still further, batch code 200 comprises line info 206 (e.g., line number 10), which indicates an identifier of the line for which the product was manufactured.

As shown in the example of FIG. 2A, each of the date of manufacture 202, the plant code 204, and the line number 10 may comprise an initial seed value (e.g., initial seed value 201). For example, as shown, these values may be used to create a seed value for generation of a sequence (e.g., sequence 310) of pseudorandom numbers (e.g., these could be either for the authentic pseudorandom numbers and/or the test pseudorandom numbers as described herein). By incorporating the date into the seed value, a key advantage arises in that, for every day in the calendar year, there is a different subset of unique pseudorandom numbers for that day. The date of the next day can be used to yield another different unique sets of codes, and so on. Use of the date value reduces the requirement of storage and memory utilization (e.g., memory 106 and/or database 105) of alphanumeric codes.

Batch code 200 may further comprise, or have positioned in a proximity, a pseudorandom alphanumeric code 208 (e.g., "AXa3"). In the example of FIG. 2A, the pseudorandom alphanumeric code 208 can be generated by cryptographic algorithm 300 as further described herein for FIGS. 3, 4B, 4A, 5A, and 5B herein.

Batch code 200 may further comprise a dot code (e.g., dot code 210). In various aspects, the dot code may correspond to pseudorandom alphanumeric code 208, and may represent a different representation (e.g., graphical representation) of a pseudorandom alphanumeric code 208. Dot code 210 is further described herein with respect to FIGS. 5A and 5B.

FIG. 2B illustrates a further example batch code 250 as generated by pseudorandom batch code printing and product authentication systems and methods, in accordance with various aspects disclosed herein. In the example of FIG. 2B, batch code 250 is identical to batch code 200 of FIG. 2A, but the pseudorandom alphanumeric code 208 is not printed on the product; only dot code 210 is printed on the product. However, the pseudorandom alphanumeric code (e.g., "AXa3") is still calculated, and then used to generate or otherwise determine dot code 210 (e.g., as described herein for FIGS. 5A and 5B). Batch code 250 represents a shortened version of batch code 200, where batch code 250 comprises the same information, but in yet a more compact form, which is advantageous in printing on products with limited or difficult surface area(s). A further advantage is that the there is a higher barrier to a counterfeiter copying a dot code compared to an alphanumeric code.

FIG. 3 illustrates an example cryptographic algorithm 300 used to generate a sequence 310 of pseudorandom alphanumeric codes, in accordance with various aspects disclosed herein. With reference to FIG. 3, cryptographic algorithm 300 is shown as a formula:

$$X_{n+1} = \mathrm{MOD}_m[a^*X_n + b]$$

In cryptographic algorithm 300, $X_1$ (the initial value of $X_n$) is the initial (seed) number, which may be determined from a date value (e.g., product date of manufacture) and/or other values, e.g., as shown for initial seed value 201 of FIG. 2A herein. Further, in cryptographic algorithm 300, $X_n$ is the $n^{th}$ number in a given sequence, whereby the $n^{th}$ pseudorandom number or a subsequent derivative thereof is input into the cryptographic algorithm 300 to output a next pseudorandom number ($X_{n+1}$) of the sequence.

Still further, cryptographic algorithm 300, $\mathrm{MOD}_m$ is the modulo function applied with modulus value m, where m may comprise a prime number (e.g., 120767). The modulo operation returns the remainder or signed remainder of a division operation, after the output of the calculation $[a^*X_n + b]$ is divided by the modulus m. Because of the modulo operation, the output of cryptographic algorithm 300 (defined by $X_{n+1}$), and therefore the series defined by cryptographic algorithm 300, will repeat after m−1 numbers. Because of this, the value of m will define an approximate maximum batch size. In the cryptographic algorithm 300, values a and b may comprise integer values, which may be any integer values. For example, the values chosen for example cryptographic algorithm 300 may comprise, e.g., a=83, b=52, m=120767, where these values determine the output of cryptographic algorithm 300 (defined by $X_{n+1}$), which is next pseudorandom number in the sequence. In some aspects, the values of a and/or b can be changed or updated, e.g., by computing instructions controlling printer 130 and/or the batch code printing app 108 at periodic intervals so as to provide additional security against a counterfeiter determining or reverse engineering the formula for creating the sequence of alphanumeric codes (e.g., cryptographic algorithm 300).

Cryptographic algorithm 300 may be implemented or executed by processor(s) 104, and be a part of, or assessed by, batch code printing app 108. Cryptographic algorithm 300 may be used to generate a sequence of pseudorandom numbers. Examples of the sequence of pseudorandom numbers include the authenticating sequence of authentic pseudorandom numbers, and the sequence of test pseudorandom numbers as described herein, e.g., for method 160 of FIGS. 1B and 1C. Each pseudorandom number in the sequence may then be converted into an alphanumeric code (e.g., such as pseudorandom alphanumeric code 208). In this way, a first pseudorandom number is used to create the second pseudorandom number, so on. These pseudorandom numbers determine the value, configuration, or otherwise appearance of an alphanumeric code, for example, as described herein. While FIG. 3 illustrates one example of a cryptographic algorithm, it should be understood that other cryptographic algorithms, in addition to, or different from, example cryptographic algorithm 300 may be used.

In various aspects, cryptographic algorithm 300 uses the initial seed value (e.g., initial seed value 201) as input (a starting point) to cryptographic algorithm 300 and calculates a pseudo random sequence (e.g., sequence 310) of numbers. Each number in the pseudo random sequence (e.g., sequence 310) may be used to choose alphanumeric values and font choices, e.g., from a font set table as described further herein for FIGS. 4A and 5B.

With further reference to FIG. 3, sequence 310 is a sequence of alphanumeric codes generated based on pseudorandom numbers as output by cryptographic algorithm 300. In particular, sequence 310 may be generated by batch code printing app 108 and represents alphanumeric codes based on the authenticating pseudorandom numbers as output by cryptographic algorithm 300. Sequence 310 comprises a first alphanumeric code 311 (e.g., "AXa3"), a second alphanumeric code 312 (e.g., "J8V3"), a third alphanumeric code 313 (e.g., "SI5A"), a fourth alphanumeric code 314 (e.g., "4nw9"), and next ("nth" set) alphanumeric codes 315 (represented by place holder " . . . "), which would be a next alphanumeric code generated in the sequence by cryptographic algorithm 300.

Each alphanumeric code of sequence 310 may be printed on a product (e.g., a shampoo bottle). In addition, in some aspects, products may be included as part of a product batch (e.g., product batch 150). For example, one or more of a first product 151, a second product 152, a third product 153, a fourth product 154, a fifth product 155, and so on (e.g., additional products) may be packages as part of a product batch (e.g., product batch 150). Each of the products may have printed thereon (e.g., by printer 130) a sequence (e.g., sequence 310) of alphanumeric codes, e.g., as determined based on the cryptographic algorithm 300. In this, way alphanumeric codes from a given set of products (e.g., product batch 150) may be packaged, boxed, or otherwise grouped together and may be identifiably related based on a family or group of related alphanumeric codes. For example, given an alphanumeric code (e.g., "AXa3") on one product (e.g., product 151) in a product batch (e.g., product batch 150), it can be determined what the codes for the remaining products in the batch should be.

For example, where first product 151, second product 152, third product 153, fourth product 154, fifth product 155 comprise a box of products or product batch (e.g., product batch 150), then each of those products would be expected to have a sequence of codes based on output by cryptographic algorithm 300. Any product not conforming to the sequence could be identified as counterfeit. For example, if one product was swapped out of the box of products, then it would be identifiable that the swapped product is invalid or counterfeit because the invalid or counterfeit product would not have a valid code in the sequence 310. This could help address a common tactic by counterfeiters who mix counterfeit with genuine product.

As a further example, given that alphanumeric codes are defined in a sequence, then ordering (or disordering) of products can also be determined. For example, in sequence 310, alphanumeric code ("J8V") should come after "AXa3." In a box of multiple products, the products can be ordered based on codes, where it can later be identified whether one or more products in the box have been replaced and/or disordered.

Figure 4A:
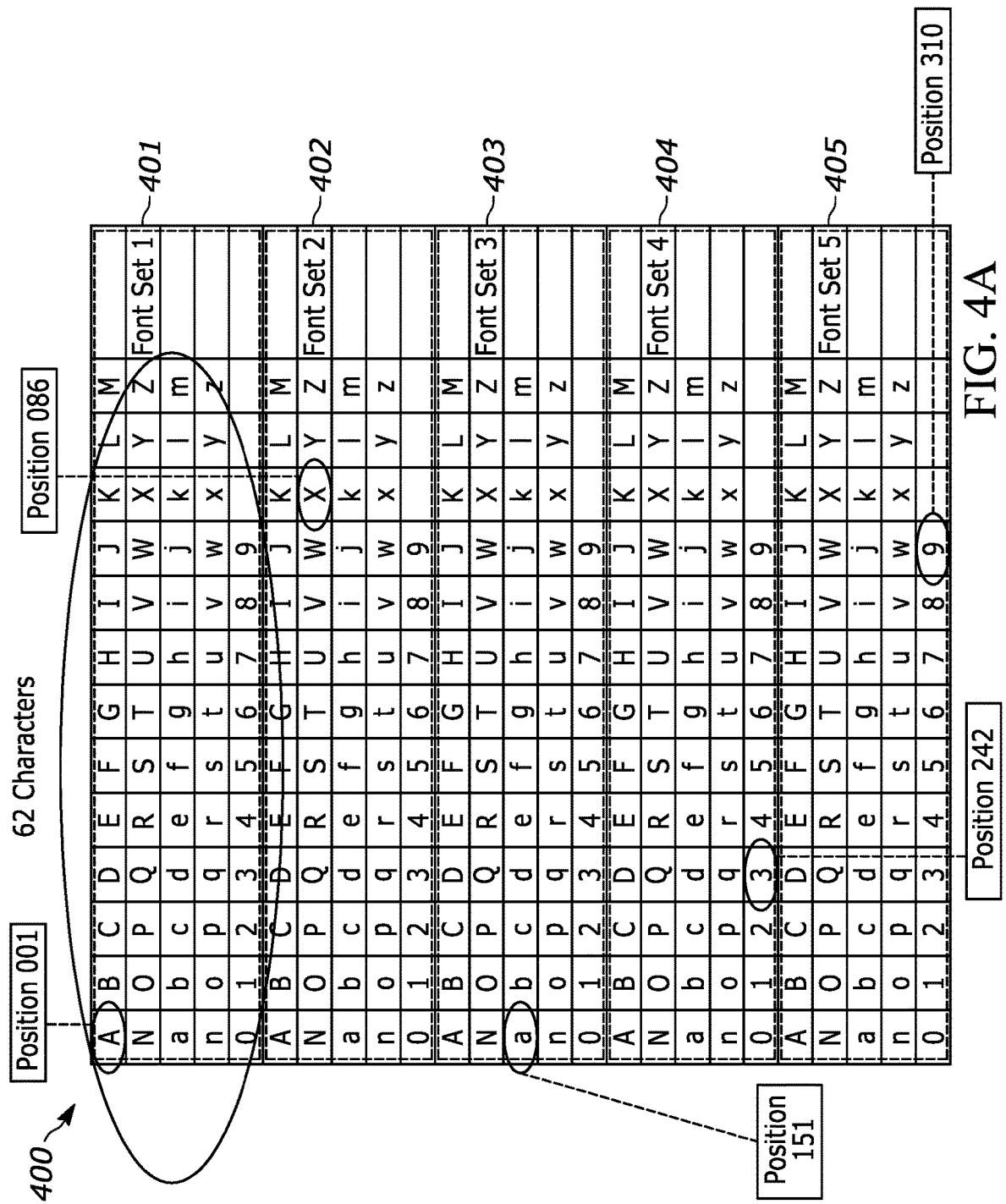
FIG. 4A illustrates an example font set table, in accordance with various aspects disclosed herein.

FIG. 4A illustrates an example font set table 400, in accordance with various aspects disclosed herein. Font set table 400 may comprise an in-memory (e.g., stored in computer memory 106 and/or database 105) data table or otherwise data structure used to select fonts of a given alphanumeric code (e.g., pseudorandom alphanumeric code 208). Font set table 400 may be used to apply different fonts for one or more digit(s) and/or character(s) of a given alphanumeric code (e.g., pseudorandom alphanumeric code 208).

A font set table may be comprised of one or more predefined font sets. For example, font set table 400 is comprised of five predefined font sets, e.g., including font set 1 401, font set 2 402, font set 3 403, font set 4 404, and font set 5 405. The font sets are predefined in memory to have different fonts, styles, case (lower case or upper case), different sizes, and/or otherwise different appearances. The different fonts can be of different types (e.g. Times New Roman, Arial, etc.) and can be styled with italics, bolding, rotating, or the like. Additionally, or alternatively, each different digit or character in a font set table may include missing dots or elements, e.g., as shown for the different digits and/or characters of pseudorandom alphanumeric code 208.

In the example, of FIG. 4A each predefined font set comprises 62 characters (A-Z, a-z, and 0-9) and 5 font choices. As a whole, the 5 font choices (each with 62 characters) result in 310 (i.e., 62 times 5) total font selections. Each character in the number of 310 font selections of font set table 400 has its own position value. For example, as shown, font character "A" of font set 1 401 has a position of "001" in font set table 400. This is because this character appears at a first memory (e.g., in memory 106 or database 105) address, location, or otherwise logical position within font set table 400. As a further example, font character "X" of font set 2 402 has a position of "086" in font set table 400, corresponding to a respective memory (e.g., in memory 106 or database 105) location or otherwise logical position within font set table 400. As a still further example, font character "a" of font set 3 403 has a position of "151" in font set table 400, corresponding to a respective memory (e.g., in memory 106 or database 105) location or otherwise logical position within font set table 400. As a still further example, font character "3" of font set 4 404 has a position of "242" in font set table 400, corresponding to a respective memory (e.g., in memory 106 or database 105) location or otherwise logical position within font set table 400. As a final example, font character "9" of font set 5 405 has a position of "310" in font set table 400, corresponding to a final memory (e.g., in memory 106 or database 105) location or otherwise logical position within font set table 400. It is to be understood that the remaining characters have similar respective positions corresponding to respective memory (e.g., in memory 106 or database 105) locations or otherwise logical positions within font set table 400.

Further, is to be understood that different and/or additional numbers of characters may also be used in order to configure font size table(s) having different sizes. In addition, the each of the one or more predefined font sets or the entirety of the font set table 400 may be scrambled or rearranged such that the fonts and/or related digits and/or characters are not in a logical order.

Figure 4B:
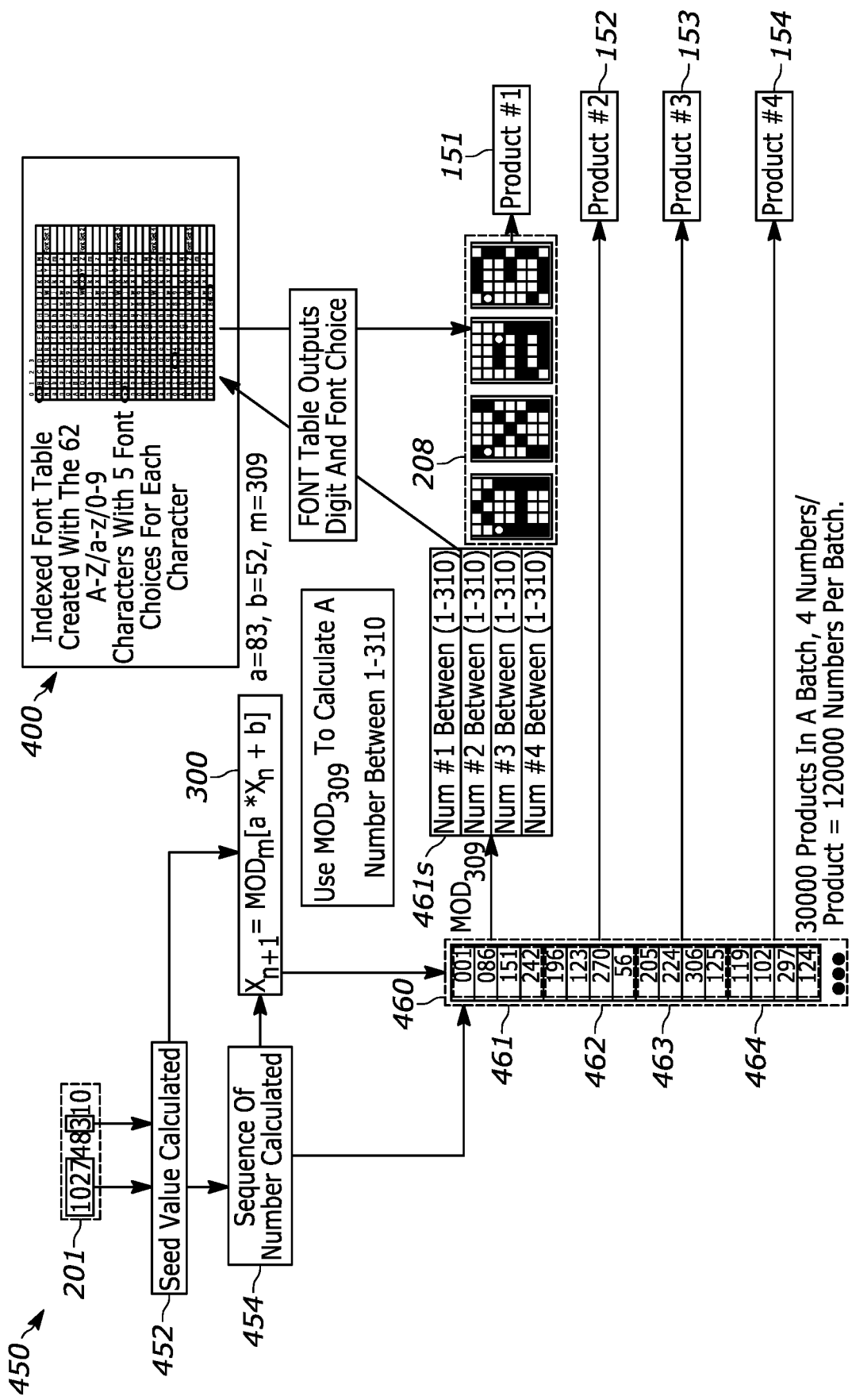
FIG. 4B illustrates an example pseudorandom batch code printing and product authentication method, in accordance with various aspects disclosed herein.

FIG. 4B illustrates an example pseudorandom batch code printing and product authentication method 450, in accordance with various aspects disclosed herein. Method 450 illustrates and algorithm for using font set table 400 of FIG. 4A to generate an alphanumeric code (e.g., pseudorandom alphanumeric code 208). In various aspects, each character of an alphanumeric code may have one or more different fonts and/or alternations. For example, in the example of FIG. 4B, pseudorandom alphanumeric code 208 comprises characters (e.g., number characters or alpha characters such as numbers and/or letters) having different fonts as selected from at least one of the plurality of predefined font sets of font set table 400 of FIG. 4A. Method 450 comprises an algorithm that may be used by method 160 to generate alphanumeric codes.

As shown for FIG. 4B, method 450 comprises calculating a seed value. In the example of FIG. 4B, at block 452, method 450 comprises selecting portions of initial seed value 201. In the example of FIG. 4B, the initial seed value includes selecting the date of manufacture 202 (e.g., a Julian date "1027") and a portion of the plant code 204 (e.g., "3").

At block 454, method 450 comprises inputting the initial seed value into cryptographic algorithm 300 to generate an authenticating sequence 460. As shown, cryptographic algorithm 300 is configured to use modulus (m) value of 309, and integer values a and b set to "83" and "52," respectively. As a first step, the initial seed value is input into cryptographic algorithm 300 to output an initial authenticating pseudorandom number ("168") in the authenticating sequence.

More broadly, authentic authenticating sequence 460 comprises a series of pseudorandom numbers ("001," "086," "151," "242," "196," "123," etc.) generated by cryptographic algorithm 300. As shown for authenticating sequence 460, each subsequent authenticating pseudorandom number in the authenticating sequence 460 is generated directly or indirectly from the initial authenticating pseudorandom number whereby the initial authenticating pseudorandom number or a subsequent derivative thereof is input into the cryptographic algorithm 300 to output a next authenticating pseudorandom number of the authenticating sequence 460.

In the example of FIG. 4B, authenticating sequence 460 comprises sets of one or more pseudorandom numbers. These sets include a first set 461 of one or more pseudorandom numbers ("001," "086," "151," "242,") in the authenticating sequence 460; a second set 462 of one or more pseudorandom numbers ("196," "123," "270," "56,") in the authenticating sequence 460; a third set 463 of one or more pseudorandom numbers ("205," "224," "306," "125,") in the authenticating sequence 460; and a fourth set 464 of one or more pseudorandom numbers ("119," "102," "297," "124") in the authenticating sequence 460.

Each pseudorandom number is used to look up a position value in the font set table 400. That is, the value of the pseudorandom number is used as a lookup number or indexing value to select a corresponding character at the given position defined by the pseudorandom number in font set table 400. Thus, the initial pseudorandom number ("001") of first set 461 is used as an index to lookup, index, or otherwise access character "A" in font set table 400 for font set 1 401. Similarly, the next pseudorandom number ("086") of first set 461 is used as an index to lookup, index, or otherwise access character "X" in font set table 400 for font set 1 401. Still further, the next pseudorandom number ("151") of first set 461 is used as an index to lookup, index, or otherwise access character "a" in font set table 400 for font set 1 401. Still further, the next pseudorandom number ("242") of first set 461 is used as an index to lookup, index, or otherwise access character "3" in font set table 400 for font set 1 401. The lookup and/or indexing may be performed by one or more processors (e.g., processor(s) 104) implementing an application (app), e.g., by batch code printing app 108. Once the pseudorandom numbers are calculated, they may be used to determine values for the pseudorandom alphanumeric code 208 ("AXa3"). These values may looked-up, or otherwise accessed or determined, from font set table 400, e.g., as described for FIG. 4A herein.

Pseudorandom alphanumeric code 208 may then be printed on a product (e.g., product 1 of FIG. 3) with printer 130 as described herein.

The remaining sets 462, 463, and 464 and their respective pseudorandom numbers may be used similarly to generate corresponding pseudorandom alphanumeric codes ("J8V3", "S15A", and "4nw9," respectively) for printing on products 2, 3, and 4, respectively, as shown for FIG. 3, and as illustrated for FIG. 4B.

It is to be understood that a greater and/or different amount of pseudorandom numbers and respective pseudorandom alphanumeric codes may be generated using method 450. That is, while method 450 shows 16 pseudorandom numbers used to generate four respective pseudorandom alphanumeric codes, it is envisioned that method 450 or method 160 (or as otherwise described herein) may be used to generate thousands (or tens of thousands) of codes for printing on thousands (or tens of thousands) of products across many batches of products. For example, method 450 may be used to generate 120,000 pseudorandom numbers used for 4-digit pseudorandom alphanumeric codes that may be printed on 30,000 products. Other combinations of pseudorandom numbers, pseudorandom alphanumeric codes, and product may also be used and are contemplated herein.

Figure 5A:
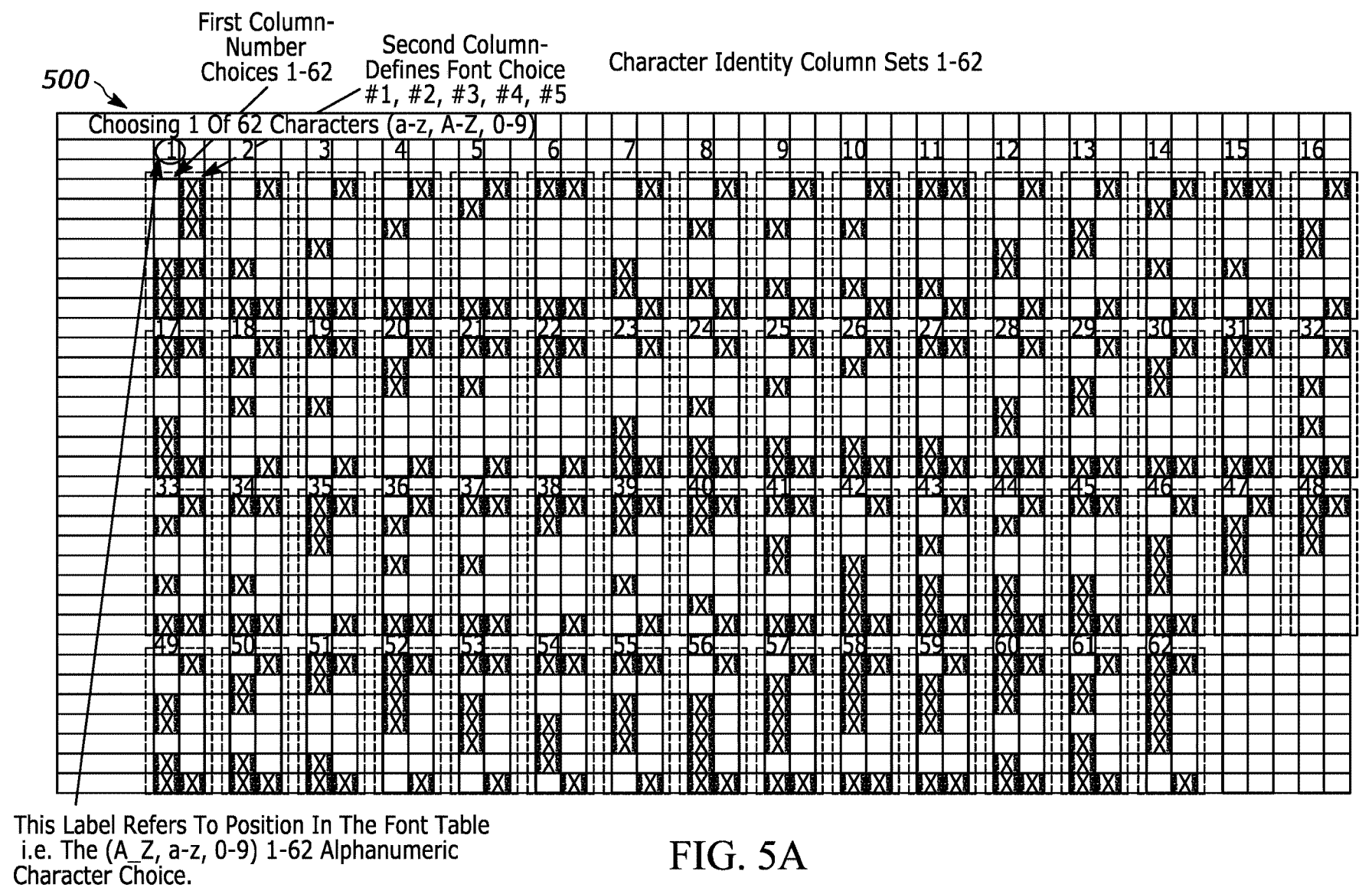

FIG. 5A illustrates an example character identity lookup table 500, in accordance with various aspects disclosed herein. In various aspects, character identity lookup table 500 comprises an in-memory data table or otherwise logical data structure used for generating a matrix or otherwise grouping of dots for generation of a dot code (e.g., dot code 210). The dot code may be printed as part of, or otherwise with, an alphanumeric code. For example, batch code 200 and batch code 250 each comprise a dot code (e.g., dot code 210) as shown for FIGS. 2A and 2B, but FIG. 2B includes a dot code alone.

A dot code is configured for scanning by an imaging device. In various aspects, the dot code may be scanned or imaged via scanning or imaging of a dot code (e.g., dot code 210) with a scanner and/or camera of a user computer device (e.g., user computing device 112c1). Once scanned or imaged, the character identity lookup table 500 may be accessed (e.g., via processor(s) 104 or a device processor of user computing device 112c1) in order to determine a pseudorandom batch code from the positioning of the dots in the dot code.

As shown in the example of FIG. 5A, the character identity lookup table 500 comprises a plurality of character identity column sets labelled 1-62. Each label corresponds to a position of a character within font set table 400. That is, because font set table 400 has 62 total characters, there are 62 total character identity column sets in identity lookup table 500 in the example of FIG. 5A. It is to be understood that different, fewer, and/or additional characters, and, therefore corresponding character identity column sets, may be used in accordance with the disclosure herein.

In the example of FIG. 5A, each character identity column set comprises two columns and seven rows. A first column of each character identity column set defines a position value within a font set table mapped to the alphanumeric code. That is, the column of the first character identity column set chooses, indexes, or otherwise maps to a character value (e.g. "A" or "3") within the example font set table 400.

The second column of each character identity column set defines a font set selection value that selects the font set from a plurality of predefined font sets of the font set table. The font will be applied, used, or accessed so the font of the character of the first column will correspond to a given predefined font set. That is, with respect to example font set table 400, the second column of a character identity column set chooses which of the five predefined font sets, e.g., including font set 1 401, font set 2 402, font set 3 403, font set 4 404, and font set 5 405 from example font set table 400 to apply to, access on behalf of, or otherwise use for the character ("A") as identified by the first column of a given character identity column set.

Together the first and second columns of a given character identity column define or provide a choice of both the character (first column) and the font (second column) of the character.

Further, in various aspects, each character identity column set for a given label 1-62 (or other range) may be have location values ("x") in each of the columns. These location values indicate the physical locations for the dots in the dot code. Further, these location values may be randomized such that each character identity column may have non-sequential or non-ordered location values. For example, for character identity column set at label 1, the first column has three location values ("x" values) in the bottom three rows. In the example of FIG. 5A, this corresponds to a character of "A," and the character identity lookup table 500 is configured such that imaging, analysis, or otherwise recognition of a character identity column set with this pattern corresponds to, returns, or reveals that the character "A" is intended.

Similarly, for character identity column set at label 1, the second column has five location values ("x" values) in spread across the rows in a given pattern. The top and bottom location values may be statically fixed (always used) across the identity lookup table 500 (although this is not a requirement). The remaining three values, in the pattern as shown across the rows for column 2, may indicate that font set 1 401 is to be used, accessed, or applied for the character "A." In this way, the character identity lookup table 500 is configured such that imaging, analysis, or otherwise recognition of a character identity column set with this pattern corresponds to, returns, or reveals that font set 1 401 is applicable.

While FIG. 5A shows only one character identity column set at label 1 having location values, it is to be understood that the remaining character identity column sets (for labels 2-62) may also have location values corresponding to the remaining font sets (e.g., font set 2 402, font set 3 403, font set 4 404, and font set 5 405).

In addition, while the character identity column sets of FIG. 5A each have 2 columns and seven rows, it is to be understood that different and/or additional columns or rows may be used for each character identity column set for generation of dot code(s) in accordance with the disclosure herein.

Figure 5B:
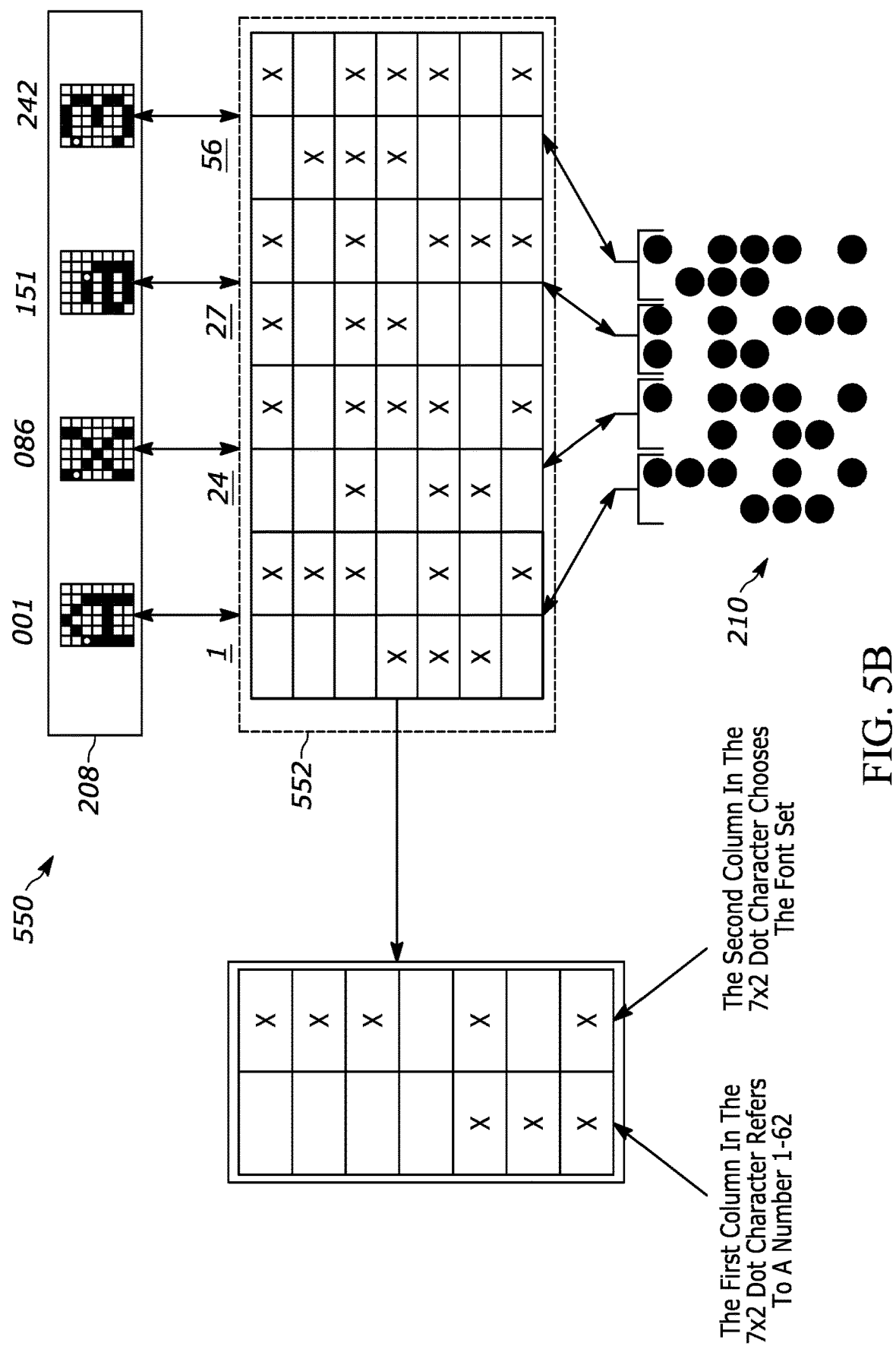
FIG. 5B illustrates an example dot code algorithm and related dot code, in accordance with various aspects disclosed herein.

FIG. 5B illustrates an example dot code algorithm 550 and related dot code 210, in accordance with various aspects disclosed herein. The example of FIG. 5B illustrates how a dot code (e.g., dot code 210) can be generated from a pseudorandom alphanumeric code (e.g., pseudorandom alphanumeric code 208) and vice-versa, e.g., how a pseudorandom alphanumeric code (e.g., pseudorandom alphanumeric code 208) can be determined from a dot code (e.g., dot code 210).

As shown for FIG. 5B, a dot code (e.g., dot code 210) comprises as a matrix of dots having one or more character identity column sets (e.g., defined by 2×7 dot matrix columns and rows, respectively). Each character identity column set of a given column set defines (a) an alphanumeric character derived from an authenticating sequence (e.g., as output by cryptographic algorithm 300), and (2) a font set to be applied to the alphanumeric character (e.g., either an alpha or numeric) when printed. That is, the alphanumeric character ("A") is determined from authenticating sequence and/or test sequence of numbers as generated by cryptographic algorithm 300 herein, where the cryptographic algorithm 300 outputs a position value corresponding to the character in font set table 400.

In the example of FIG. 5B, a group 552 of four character identity column sets are used. These include the character identity column sets with labels 1 (for "A"), 24 (for "X"), 27 (for "a"), and 56 (for "3") defining the positions in character identity lookup table 500. These labels correspond to the first columns of each of the character identity column sets. That is, each of the respective second columns represent font sets (e.g., font set 1 401, font set 2 402, font set 3 403, font set 4 404, and font set 5 405) each having receptive patterns defining location values mapped or corresponding to the font sets for choosing one of the five font sets.

In one aspect, dot code algorithm 550, executing on processor(s) 104 or a device processor of user computing device 112c1, can generate dot code 210 by reading the characters of pseudorandom alphanumeric code 208 (e.g., having characters at positions "001" for "A," "086" for "X," "151" for "a," and "242" for "3" of font set table 400), and looking up the respective positions in identity lookup table 500 for the given characters and applied fonts. In this way, the group 552 of four character identity column sets with labels 1 (for "A"), 24 (for "X"), 27 (for "a"), and 56 (for "3") can be determined from pseudorandom alphanumeric code 208. The group 552 of four character identity column sets may then be used to determine the configuration, arrangement, and positioning of the matrix of dots of dot code 210. As shown, the positions of the dots of dot code 210 correspond to the positions of the location values in the group 552 of four character identity column sets.

In another aspect, dot code algorithm 550, executing on processor(s) 104 or a device processor of user computing device 112c1, may be used to determine pseudorandom alphanumeric code 208 from the dot code 210. A camera or scanner of a user computing device 112cl can be used to image or scan dot code 210. The physical positions of the dots in dot code 210 may then be matched to the location values for corresponding character identity column sets. In the example of FIG. 5B, the dots of dot code 210 are mapped to or otherwise correspond to group 552 of the four character identity column sets with labels 1 (for "A"), 24 (for "X"), 27 (for "a"), and 56 (for "3"). By analysing each of the four character identity column sets, and accessing example font set table 400, the characters may be determined (e.g., "001" for "A," "086" for "X," "151" for "a," and "242" for "3" of font set table 400). Once the characters are determined, the pseudorandom alphanumeric code 208 may be generated or otherwise determined.

In various aspects, the pseudorandom alphanumeric code 208, as determined from dot code 210, may be compared to an authentic or test alphanumeric code derived from at least one test pseudorandom number of an authenticating or test sequence as described herein. If the pseudorandom alphanumeric code 208 matches an authentic code, then an authenticating output may be generated. Otherwise a counterfeit output may be generated as described herein.

Aspects of the Disclosure

The following aspects are provided as examples in accordance with the disclosure herein and are not intended to limit the scope of the disclosure.

1. A pseudorandom batch code printing and product authentication system comprising: one or more processors; and a batch code printing application (app) comprising computing instructions configured to be executed by the one or more processors, wherein the computing instructions of the batch code printing app, when executed by the one or more processors, are configured to cause the one or more processors to: generate an authenticating sequence of authentic pseudorandom numbers by inputting an initial seed value into a cryptographic algorithm to output an initial authenticating pseudorandom number in the authenticating sequence, wherein the initial seed value comprises a product date of a first product that is part of a product batch, wherein each subsequent authenticating pseudorandom number in the authenticating sequence is generated directly or indirectly from the initial authenticating pseudorandom number whereby the initial authenticating pseudorandom number or a subsequent derivative thereof is input into the cryptographic algorithm to output a next authenticating pseudorandom number of the authenticating sequence, generate a first alphanumeric code based on a first set of one or more pseudorandom numbers in the authenticating sequence, generate a second alphanumeric code based on a further set of pseudorandom numbers in the authenticating sequence, and control, by the one or more processors, a printer to print a first pseudorandom batch code comprising the first alphanumeric code on the first product and a second pseudorandom batch code comprising the second alphanumeric code on a second product, wherein the second product is part of the product batch.

2. The pseudorandom batch code printing and counterfeit detection system of aspect 1 further comprising: an authentication application (app) comprising instructions configured to be executed by the one or more processors, wherein the computing instructions of the authentication app, when executed by the one or more processors, are configured to cause the one or more processors to: determine an identified product date and a suspect alphanumeric code from a suspect batch code as printed on a suspect product; generate a test sequence of test pseudorandom numbers by inputting the identified product date as a test seed value into the cryptographic algorithm to output an initial test pseudorandom number in the test sequence, wherein each subsequent test pseudorandom number in the test sequence is generated directly or indirectly from the initial test pseudorandom number whereby the initial test pseudorandom number or a subsequent derivative thereof is input into the cryptographic algorithm to output a next test pseudorandom alphanumeric number of the test sequence; and generate an output comprising one of: (1) an authenticating output indicating that the suspect product is authentic when the suspect alphanumeric code matches a test alphanumeric code derived from at least one test pseudorandom number of the test sequence; or (2) a counterfeit output indicating that the suspect product is counterfeit when the suspect alphanumeric code fails to match a test alphanumeric code derived from at least one test pseudorandom number of the test sequence.

3. The pseudorandom batch code printing and counterfeit detection system of aspect 2 further comprising: a mobile application (app) comprising computing instructions configured to be executed by a device processor of a mobile device, wherein the computing instructions of the mobile app, when executed by device processor, is configured to cause the device processor to: capture, by a camera of the mobile device, an image of the batch code as printed on the suspect product, and determine the identified product date from the image of the batch code.

4. The batch code printing and counterfeit detection system of any one of aspects 1-3, wherein at least one of the first pseudorandom batch code or the second pseudorandom batch code comprises a dot code configured for scanning by an imaging device, wherein the dot code comprises as a matrix of dots having one or more character identity column sets, each character identity column set of the one or more column sets defining (a) an alphanumeric character derived from the authenticating sequence and (2) a font set to be applied to the alphanumeric character when printed.

5. The batch code printing and counterfeit detection system of aspect 4, wherein a first column of each character identity column set defines a position value within a font set table mapped to the alphanumeric code, and wherein a second column of each character identity column set defines a font set selection value that selects the font set from a plurality of predefined font sets of the font set table.

6. The pseudorandom batch code printing and counterfeit detection system of aspect 5, wherein the alphanumeric code comprises characters having different fonts as selected from at least one of the plurality of predefined font sets.

7. The pseudorandom batch code printing and counterfeit detection system of aspect 2, wherein generation of the output further comprises submitting one or both of the suspect batch code and the suspect alphanumeric code to an authentication database comprising a list of known counterfeit batch codes, wherein the counterfeit output is provided in response when the one or both of the suspect batch code and the suspect alphanumeric code match at least one known counterfeit batch code identified within the known counterfeit batch codes, and wherein the authenticating output is provided in response when the one or both of the suspect batch code and the suspect alphanumeric code fail to match at least one known counterfeit batch code within the known counterfeit batch codes.

8. The pseudorandom batch code printing and counterfeit detection system of any one of aspects 1-7, wherein the first product and the second product are packaged as part of a package or unit of products each having a sequence of alphanumeric codes.

9. The pseudorandom batch code printing and counterfeit detection system of any one of aspects 1-8, wherein the initial seed value further comprises one or more values associated with the first product selected from: a manufacturing plant ID code, manufacturing line information, or batch number information.

10. The pseudorandom batch code printing and counterfeit detection system of aspect 2, wherein the test seed value further comprises one or more values associated with the suspect product selected from: a manufacturing plant ID code, manufacturing line information, or batch number information.

11. A pseudorandom batch code printing and product authentication method comprising: generating, by a batch code printing application (app) executing on one or more processors, an authenticating sequence of authentic pseudorandom numbers by inputting an initial seed value into a cryptographic algorithm to output an initial authenticating pseudorandom number in the authenticating sequence, wherein the initial seed value comprises a product date of a first product that is part of a product batch, wherein each subsequent authenticating pseudorandom number in the authenticating sequence is generated directly or indirectly from the initial authenticating pseudorandom number whereby the initial authenticating pseudorandom number or a subsequent derivative thereof is input into the cryptographic algorithm to output a next authenticating pseudorandom number of the authenticating sequence; generating, by the batch code printing app, a first alphanumeric code based on a first set of one or more pseudorandom numbers in the authenticating sequence; generating, by the batch code printing app, a second alphanumeric code based on a further set of one or more pseudorandom numbers in the authenticating sequence; and controlling, by the one or more processors, a printer to print a first pseudorandom batch code comprising the first alphanumeric code on the first product and a second pseudorandom batch code comprising the second alphanumeric code on a second product, wherein the second product is part of the product batch.

12. The pseudorandom batch code printing and counterfeit detection method of aspect 11 further comprising: determining, by an authentication application (app) executing on the one or more processors, an identified product date and a suspect alphanumeric code from a suspect batch code as printed on a suspect product; generating a test sequence of test pseudorandom numbers by inputting the identified product date as a test seed value into the cryptographic algorithm to output an initial test pseudorandom number in the test sequence, wherein each subsequent test pseudorandom number in the test sequence is generated directly or indirectly from the initial test pseudorandom number whereby the initial test pseudorandom number or a subsequent derivative thereof is input into the cryptographic algorithm to output a next test pseudorandom alphanumeric number of the test sequence; and generating an output comprising one of: (1) an authenticating output indicating that the suspect product is authentic when the suspect alphanumeric code matches a test alphanumeric code derived from at least one test pseudorandom number of the test sequence; or (2) a counterfeit output indicating that the suspect product is counterfeit when the suspect alphanumeric code fails to match a test alphanumeric code derived from at least one test pseudorandom number of the test sequence.

13. The pseudorandom batch code printing and counterfeit detection method of aspect 12 further comprising: a mobile application (app) comprising computing instructions configured to be executed by a device processor of a mobile device, wherein the computing instructions of the mobile app, when executed by device processor, is configured to cause the device processor to: capture, by a camera of the mobile device, an image of the batch code as printed on the suspect product, and determine the identified product date from the image of the batch code.

14. The batch code printing and counterfeit detection method of any one of aspects 11-13, wherein at least one of the first pseudorandom batch code or the second pseudorandom batch code comprises a dot code configured for scanning by an imaging device, wherein the dot code comprises as a matrix of dots having one or more character identity column sets, each character identity column set of the one or more column sets defining (a) an alphanumeric character derived from the authenticating sequence and (2) a font set to be applied to the alphanumeric character when printed.

15. The batch code printing and counterfeit detection method of aspect 14, wherein a first column of each character identity column set defines a position value within a font set table mapped to the alphanumeric code, and wherein a second column of each character identity column set defines a font set selection value that selects the font set from a plurality of predefined font sets of the font set table.

16. The pseudorandom batch code printing and counterfeit detection method of aspect 15, wherein the alphanumeric code comprises characters having different fonts as selected from at least one of the plurality of predefined font sets.

17. The pseudorandom batch code printing and counterfeit detection method of aspect 12, wherein generation of the output further comprises submitting one or both of the suspect batch code and the suspect alphanumeric code to an authentication database comprising a list of known counterfeit batch codes, wherein the counterfeit output is provided in response when the one or both of the suspect batch code and the suspect alphanumeric code match at least one known counterfeit batch code identified within the known counterfeit batch codes, and wherein the authenticating output is provided in response when the one or both of the suspect batch code and the suspect alphanumeric code fail to match at least one known counterfeit batch code within the known counterfeit batch codes.

18. The pseudorandom batch code printing and counterfeit detection method of any one of aspects 11-17, wherein the first product and the second product are packaged as part of a package or unit of products each having a sequence of alphanumeric codes.

19. The pseudorandom batch code printing and counterfeit detection method of any one of aspects 11-18, wherein the initial seed value further comprises one or more values associated with the first product selected from: a manufacturing plant ID code, manufacturing line information, or batch number information.

20. The pseudorandom batch code printing and counterfeit detection method of aspect 12, wherein the test seed value further comprises one or more values associated with the suspect product selected from: a manufacturing plant ID code, manufacturing line information, or batch number information.

21. A tangible, non-transitory computer-readable medium storing instructions for implementing pseudorandom batch code printing and counterfeit detection, that when executed by one or more processors cause the one or more processors to: generate an authenticating sequence of authentic pseudorandom numbers by inputting an initial seed value into a cryptographic algorithm to output an initial authenticating pseudorandom number in the authenticating sequence; wherein the initial seed value comprises a product date of a first product that is part of a product batch, wherein each subsequent authenticating pseudorandom number in the authenticating sequence is generated directly or indirectly from the initial authenticating pseudorandom number whereby the initial authenticating pseudorandom number or a subsequent derivative thereof is input into the cryptographic algorithm to output a next authenticating pseudorandom number of the authenticating sequence, generate a first alphanumeric code based on a first set of one or more pseudorandom numbers in the authenticating sequence, generate a second alphanumeric code based on a further set of pseudorandom numbers in the authenticating sequence; and control a printer to print a first pseudorandom batch code comprising the first alphanumeric code on the first product and a second pseudorandom batch code comprising the second alphanumeric code on a second product, wherein the second product is part of the product batch.

22. The tangible, non-transitory computer-readable medium of aspect 21, wherein the instructions, when executed by one or more processors, further cause the one or more processors to: determine an identified product date and a suspect alphanumeric code from a suspect batch code as printed on a suspect product; generate a test sequence of test pseudorandom numbers by inputting the identified product date as a test seed value into the cryptographic algorithm to output an initial test pseudorandom number in the test sequence, wherein each subsequent test pseudorandom number in the test sequence is generated directly or indirectly from the initial test pseudorandom number whereby the initial test pseudorandom number or a subsequent derivative thereof is input into the cryptographic algorithm to output a next test pseudorandom alphanumeric number of the test sequence; and generate an output comprising one of: (1) an authenticating output indicating that the suspect product is authentic when the suspect alphanumeric code matches a test alphanumeric code derived from at least one test pseudorandom number of the test sequence; or (2) a counterfeit output indicating that the suspect product is counterfeit when the suspect alphanumeric code fails to match a test alphanumeric code derived from at least one test pseudorandom number of the test sequence.

ADDITIONAL CONSIDERATIONS

Although the disclosure herein sets forth a detailed description of numerous different aspects, it should be understood that the legal scope of the description is defined by the words of the claims set forth at the end of this patent and equivalents. The detailed description is to be construed as exemplary only and does not describe every possible aspect since describing every possible aspect would be impractical. Numerous alternative aspects may be implemented, using either current technology or technology developed after the filing date of this patent, which would still fall within the scope of the claims.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain aspects are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example aspects, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example aspects, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example aspects, the processor or processors may be located in a single location, while in other aspects the processors may be distributed across a number of locations.

The performance of certain of the operations may be distributed among the one or more processors, not only residing within a single machine, but deployed across a number of machines. In some example aspects, the one or more processors or processor-implemented modules may be located in a single geographic location (e.g., a server farm). In other aspects, the one or more processors or processor-implemented modules may be distributed across a number of geographic locations.

This detailed description is to be construed as exemplary only and does not describe every possible aspect, as describing every possible aspect would be impractical, if not impossible. A person of ordinary skill in the art may implement numerous alternate aspects, using either current technology or technology developed after the filing date of this application.

Those of ordinary skill in the art will recognize that a wide variety of modifications, alterations, and combinations can be made with respect to the above described aspects without departing from the scope of the invention, and that such modifications, alterations, and combinations are to be viewed as being within the ambit of the inventive concept.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular aspects of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A pseudorandom batch code printing and product authentication system comprising:
    one or more processors; and
    a batch code printing application (app) comprising computing instructions configured to be executed by the one or more processors,
    wherein the computing instructions of the batch code printing app, when executed by the one or more processors, are configured to cause the one or more processors to:
        generate an authenticating sequence of authentic pseudorandom numbers by inputting an initial seed value into a cryptographic algorithm to output an initial authenticating pseudorandom number in the authenticating sequence,
        wherein the initial seed value comprises a product date of a first product that is part of a product batch,
        wherein each subsequent authenticating pseudorandom number in the authenticating sequence is generated directly or indirectly from the initial authenticating pseudorandom number whereby the initial authenticating pseudorandom number or a subsequent derivative thereof is input into the cryptographic algorithm to output a next authenticating pseudorandom number of the authenticating sequence,
        generate a first alphanumeric code based on a first set of one or more pseudorandom numbers in the authenticating sequence,
        generate a second alphanumeric code based on a further set of one or more pseudorandom numbers in the authenticating sequence, and
        control, by the one or more processors, a printer to print a first pseudorandom batch code comprising the first alphanumeric code on the first product and a second pseudorandom batch code comprising the second alphanumeric code on a second product, wherein the second product is part of the product batch;
    an authentication application (app) comprising instructions configured to be executed by the one or more processors,
    wherein the computing instructions of the authentication app, when executed by the one or more processors, are configured to cause the one or more processors to:
        determine an identified product date and a suspect alphanumeric code from a suspect batch code as printed on a suspect product,
        generate a test sequence of test pseudorandom numbers by inputting the identified product date as a test seed value into the cryptographic algorithm to output an initial test pseudorandom number in the test sequence, wherein each subsequent test pseudorandom number in the test sequence is generated directly or indirectly from the initial test pseudorandom number whereby the initial test pseudorandom number or a subsequent derivative thereof is input into the cryptographic algorithm to output a next test pseudorandom alphanumeric number of the test sequence, and
        generate an output comprising one of:
            (1) an authenticating output indicating that the suspect product is authentic when the suspect alphanumeric code matches a test alphanumeric code derived from at least one test pseudorandom number of the test sequence; or (2) a counterfeit output indicating that the suspect product is counterfeit when the suspect alphanumeric code fails to match a test alphanumeric code derived from at least one test pseudorandom number of the test sequence;
wherein generation of the output further comprises submitting one or both of the suspect batch code and the suspect alphanumeric code to an authentication database comprising a list of known counterfeit batch codes,
wherein the counterfeit output is provided in response when the one or both of the suspect batch code and the suspect alphanumeric code match at least one known counterfeit batch code identified within the known counterfeit batch codes, and
wherein the authenticating output is provided in response when the one or both of the suspect batch code and the suspect alphanumeric code fail to match at least one known counterfeit batch code within the known counterfeit batch codes.

2. The pseudorandom batch code printing and product authentication system of claim 1 further comprising:
a mobile application (app) comprising computing instructions configured to be executed by a device processor of a mobile device,
wherein the computing instructions of the mobile app, when executed by device processor, is configured to cause the device processor to:
capture, by a camera of the mobile device, an image of the batch code as printed on the suspect product, and determine the identified product date from the image of the batch code.

3. The batch code printing and product authentication system of claim 1, wherein at least one of the first pseudorandom batch code or the second pseudorandom batch code comprises a dot code configured for scanning by an imaging device,
wherein the dot code comprises as a matrix of dots having one or more character identity column sets, each character identity column set of the one or more column sets defining (a) an alphanumeric character derived from the authenticating sequence and (2) a font set to be applied to the alphanumeric character when printed.

4. The batch code printing and product authentication system of claim 3,
wherein a first column of each character identity column set defines a position value within a font set table mapped to the alphanumeric code, and
wherein a second column of each character identity column set defines a font set selection value that selects the font set from a plurality of predefined font sets of the font set table.

5. The pseudorandom batch code printing and product authentication system of claim 4, wherein the alphanumeric code comprises characters having different fonts as selected from at least one of the plurality of predefined font sets.

6. The pseudorandom batch code printing and product authentication system of claim 1, wherein the first product and the second product are packaged as part of a package or unit of products each having a sequence of alphanumeric codes.

7. The pseudorandom batch code printing and product authentication system of claim 1, wherein the initial seed value further comprises one or more values associated with the first product selected from: a manufacturing plant ID code, manufacturing line information, or batch number information.

8. The pseudorandom batch code printing and product authentication system of claim 1, wherein the test seed value further comprises one or more values associated with the suspect product selected from: a manufacturing plant ID code, manufacturing line information, or batch number information.

9. A pseudorandom batch code printing and product authentication method comprising:
generating, by a batch code printing application (app) executing on one or more processors, an authenticating sequence of authentic pseudorandom numbers by inputting an initial seed value into a cryptographic algorithm to output an initial authenticating pseudorandom number in the authenticating sequence,
wherein the initial seed value comprises a product date of a first product that is part of a product batch,
wherein each subsequent authenticating pseudorandom number in the authenticating sequence is generated directly or indirectly from the initial authenticating pseudorandom number whereby the initial authenticating pseudorandom number or a subsequent derivative thereof is input into the cryptographic algorithm to output a next authenticating pseudorandom number of the authenticating sequence;
generating, by the batch code printing app, a first alphanumeric code based on a first set of one or more pseudorandom numbers in the authenticating sequence;
generating, by the batch code printing app, a second alphanumeric code based on a further set of one or more pseudorandom numbers in the authenticating sequence; and
controlling, by the one or more processors, a printer to print a first pseudorandom batch code comprising the first alphanumeric code on the first product and a second pseudorandom batch code comprising the second alphanumeric code on a second product, wherein the second product is part of the product batch;
determining, by an authentication application (app) executing on the one or more processors, an identified product date and a suspect alphanumeric code from a suspect batch code as printed on a suspect product;
generating a test sequence of test pseudorandom numbers by inputting the identified product date as a test seed value into the cryptographic algorithm to output an initial test pseudorandom number in the test sequence, wherein each subsequent test pseudorandom number in the test sequence is generated directly or indirectly from the initial test pseudorandom number whereby the initial test pseudorandom number or a subsequent derivative thereof is input into the cryptographic algorithm to output a next test pseudorandom alphanumeric number of the test sequence; and
generating an output comprising one of:
(1) an authenticating output indicating that the suspect product is authentic when the suspect alphanumeric code matches a test alphanumeric code derived from at least one test pseudorandom number of the test sequence; or
(2) a counterfeit output indicating that the suspect product is counterfeit when the suspect alphanumeric code fails to match a test alphanumeric code derived from at least one test pseudorandom number of the test sequence;
wherein generation of the output further comprises submitting one or both of the suspect batch code and the suspect alphanumeric code to an authentication database comprising a list of known counterfeit batch codes, wherein the counterfeit output is provided in response when the one or both of the suspect batch code and the suspect alphanumeric code match at least one known counterfeit batch code identified within the known counterfeit batch codes, and wherein the authenticating output is provided in response when the one or both of the suspect batch code and the suspect alphanumeric code fail to match at least one known counterfeit batch code within the known counterfeit batch codes.

10. The pseudorandom batch code printing and product authentication method of claim 9 further comprising:

a mobile application (app) comprising computing instructions configured to be executed by a device processor of a mobile device, wherein the computing instructions of the mobile app, when executed by device processor, is configured to cause the device processor to:

capture, by a camera of the mobile device, an image of the batch code as printed on the suspect product, and determine the identified product date from the image of the batch code.

11. The batch code printing and product authentication method of claim 9, wherein at least one of the first pseudorandom batch code or the second pseudorandom batch code comprises a dot code configured for scanning by an imaging device, wherein the dot code comprises as a matrix of dots having one or more character identity column sets, each character identity column set of the one or more column sets defining (a) an alphanumeric character derived from the authenticating sequence and (2) a font set to be applied to the alphanumeric character when printed.

12. The batch code printing and product authentication method of claim 11, wherein a first column of each character identity column set defines a position value within a font set table mapped to the alphanumeric code, and wherein a second column of each character identity column set defines a font set selection value that selects the font set from a plurality of predefined font sets of the font set table.

13. The pseudorandom batch code printing and product authentication method of claim 12, wherein the alphanumeric code comprises characters having different fonts as selected from at least one of the plurality of predefined font sets.

14. The pseudorandom batch code printing and product authentication method of claim 9, wherein the first product and the second product are packaged as part of a package or unit of products each having a sequence of alphanumeric codes.

15. The pseudorandom batch code printing and product authentication method of claim 9, wherein the initial seed value further comprises one or more values associated with the first product selected from: a manufacturing plant ID code, manufacturing line information, or batch number information.

16. The pseudorandom batch code printing and product authentication method of claim 9, wherein the test seed value further comprises one or more values associated with the suspect product selected from: a manufacturing plant ID code, manufacturing line information, or batch number information.

17. A tangible, non-transitory computer-readable medium storing instructions for implementing pseudorandom batch code printing and counterfeit detection, that when executed by one or more processors cause the one or more processors to:

generate an authenticating sequence of authentic pseudorandom numbers by inputting an initial seed value into a cryptographic algorithm to output an initial authenticating pseudorandom number in the authenticating sequence;

wherein the initial seed value comprises a product date of a first product that is part of a product batch, wherein each subsequent authenticating pseudorandom number in the authenticating sequence is generated directly or indirectly from the initial authenticating pseudorandom number whereby the initial authenticating pseudorandom number or a subsequent derivative thereof is input into the cryptographic algorithm to output a next authenticating pseudorandom number of the authenticating sequence, generate a first alphanumeric code based on a first set of one or more pseudorandom numbers in the authenticating sequence, generate a second alphanumeric code based on a further set of pseudorandom numbers in the authenticating sequence; and control a printer to print a first pseudorandom batch code comprising the first alphanumeric code on the first product and a second pseudorandom batch code comprising the second alphanumeric code on a second product, wherein the second product is part of the product batch;

wherein the instructions, when executed by one or more processors, further cause the one or more processors to:

determine, by an authentication application (app) executing on the one or more processors, an identified product date and a suspect alphanumeric code from a suspect batch code as printed on a suspect product;

generate a test sequence of test pseudorandom numbers by inputting the identified product date as a test seed value into the cryptographic algorithm to output an initial test pseudorandom number in the test sequence, wherein each subsequent test pseudorandom number in the test sequence is generated directly or indirectly from the initial test pseudorandom number whereby the initial test pseudorandom number or a subsequent derivative thereof is input into the cryptographic algorithm to output a next test pseudorandom alphanumeric number of the test sequence; and generate an output comprising one of:

(1) an authenticating output indicating that the suspect product is authentic when the suspect alphanumeric code matches a test alphanumeric code derived from at least one test pseudorandom number of the test sequence; or (2) a counterfeit output indicating that the suspect product is counterfeit when the suspect alphanumeric code fails to match a test alphanumeric code derived from at least one test pseudorandom number of the test sequence;

wherein generation of the output further comprises submitting one or both of the suspect batch code and the suspect alphanumeric code to an authentication database comprising a list of known counterfeit batch codes, wherein the counterfeit output is provided in response when the one or both of the suspect batch code and the suspect alphanumeric code match at least one known counterfeit batch code identified within the known counterfeit batch codes, and wherein the authenticating output is provided in response when the one or both of the suspect batch code and the suspect alphanumeric code fail to match at least one known counterfeit batch code within the known counterfeit batch codes.

* * * * *